US012787929B2

(12) United States Patent
Vandike

(10) Patent No.: US 12,787,929 B2
(45) Date of Patent: Nov. 10, 2026

(54) CROP CONDITION CATEGORIZATION SYSTEM AND METHOD

(71) Applicant: Deere & Company, Moline, IL (US)

(72) Inventor: Nathan R. Vandike, Geneseo, IL (US)

(73) Assignee: Deere & Company, Moline, IL (US)

(*) Notice: Subject to any disclaimer, the term of this patent is extended or adjusted under 35 U.S.C. 154(b) by 553 days.

(21) Appl. No.: 18/116,388

(22) Filed: Mar. 2, 2023

(65) Prior Publication Data

US 2024/0292783 A1 Sep. 5, 2024

(51) Int. Cl.
*A01D 41/127* (2006.01)

(52) U.S. Cl.
CPC ................................ *A01D 41/1271* (2013.01)

(58) Field of Classification Search
CPC .............. A01D 41/127; A01D 41/1243; A01D 41/1271; A01D 41/12; A01F 12/40; A01F 12/58; A01F 12/18; A01F 12/30
See application file for complete search history.

(56) References Cited

U.S. PATENT DOCUMENTS

| | | | | |
|---|---|---|---|---|
| 6,406,368 | B1 | 6/2002 | Cruson et al. | |
| 6,939,221 | B1 | 9/2005 | Redekop et al. | |
| 7,354,341 | B1 | 4/2008 | Smith et al. | |
| 7,485,035 | B1 | 2/2009 | Yde | |
| 9,516,812 | B2 | 12/2016 | Baumgarten et al. | |
| 9,600,872 | B2 | 3/2017 | Dima | |
| 9,699,967 | B2 | 7/2017 | Palla et al. | |
| 10,905,045 | B2 * | 2/2021 | Garrett | A01D 41/1271 |
| 2002/0072400 | A1 | 6/2002 | Foth | |
| 2003/0190939 | A1 | 10/2003 | Bueermann | |
| 2005/0059445 | A1 | 3/2005 | Niermann et al. | |
| 2005/0194473 | A1 | 9/2005 | Pearson et al. | |
| 2006/0183519 | A1 | 8/2006 | Benes | |
| 2006/0246966 | A1 | 11/2006 | Smith | |
| 2007/0026912 | A1 | 2/2007 | Anderson et al. | |
| 2007/0111766 | A1 | 5/2007 | Holmen | |
| 2007/0275775 | A1 | 11/2007 | Farley et al. | |
| 2008/0209878 | A1 | 9/2008 | Farley | |

(Continued)

FOREIGN PATENT DOCUMENTS

| | | | |
|---|---|---|---|
| BR | 102021011031 | A2 | 1/2022 |
| BR | 102021011709 | A2 | 12/2022 |

(Continued)

*Primary Examiner* — Robert E Pezzuto

(74) *Attorney, Agent, or Firm* — Taft Stettinius & Hollister LLP; Stephen F. Rost

(57) ABSTRACT

An agricultural machine includes a cutting head configured to harvest crop, a threshing assembly and a crop debris routing assembly configured to process the harvested crop, and a controller. The threshing assembly includes a thresher basket, guide vanes, and a threshing rotor, and the crop debris routing assembly includes opposing knives and a chopper rotor. The controller is configured to receive one or more machine parameters and one or more performance parameters and determine at least one of a moisture level of the harvested crop and a toughness level of the harvested crop based on the received one or more machine parameters and one or more performance parameters. The machine parameters are adjustable inputs to the agricultural machine and the performance parameters are sensed outputs of the agricultural machine.

20 Claims, 13 Drawing Sheets

(56) References Cited

U.S. PATENT DOCUMENTS

| | | | |
|---|---|---|---|
| 2008/0268927 | A1 | 10/2008 | Farley et al. |
| 2009/0005137 | A1 | 1/2009 | Isaac et al. |
| 2009/0111548 | A1 | 4/2009 | Landuyt |
| 2009/0253474 | A1 | 10/2009 | Isaac |
| 2009/0287380 | A1 | 11/2009 | Chervenka et al. |
| 2009/0325659 | A1 | 12/2009 | Overschelde et al. |
| 2011/0045883 | A1 | 2/2011 | Weichholdt et al. |
| 2011/0045884 | A1 | 2/2011 | Weichholdt et al. |
| 2011/0093169 | A1 | 4/2011 | Schroeder et al. |
| 2011/0130181 | A1 | 6/2011 | Roberge et al. |
| 2011/0237316 | A1 | 9/2011 | Isaac et al. |
| 2011/0270495 | A1 | 11/2011 | Knapp |
| 2012/0178509 | A1 | 7/2012 | Eggenhaus et al. |
| 2012/0270613 | A1 | 10/2012 | Isaac et al. |
| 2013/0095899 | A1 | 4/2013 | Knapp |
| 2013/0324199 | A1 | 12/2013 | Roberge et al. |
| 2014/0031096 | A1 | 1/2014 | Isaac et al. |
| 2014/0080555 | A1 | 3/2014 | Wagner et al. |
| 2014/0171160 | A1 | 6/2014 | Ricketts et al. |
| 2014/0302897 | A1 | 10/2014 | Isaac et al. |
| 2015/0089912 | A1 | 4/2015 | Patton et al. |
| 2015/0264864 | A1 | 9/2015 | Branch et al. |
| 2015/0351321 | A1 | 12/2015 | Shane |
| 2015/0373913 | A1 | 12/2015 | Berry |
| 2016/0088794 | A1 | 3/2016 | Baumgarten et al. |
| 2016/0374267 | A1 | 12/2016 | Reinecke et al. |
| 2017/0034997 | A1 | 2/2017 | Mayerle |
| 2017/0055444 | A1 | 3/2017 | Mahieu et al. |
| 2017/0055445 | A1 | 3/2017 | Mahieu et al. |
| 2017/0071125 | A1 | 3/2017 | Pfeiffer et al. |
| 2017/0086372 | A1 | 3/2017 | Palla et al. |
| 2017/0086373 | A1 | 3/2017 | Mahieu et al. |
| 2017/0112055 | A1 | 4/2017 | Depreitere et al. |
| 2017/0142900 | A1 | 5/2017 | Mahieu et al. |
| 2017/0215330 | A1 | 8/2017 | Missotten et al. |
| 2017/0238463 | A1 | 8/2017 | Van de Wege et al. |
| 2018/0007831 | A1 | 1/2018 | Ballegeer et al. |
| 2018/0084718 | A1 | 3/2018 | Baumgarten et al. |
| 2018/0092301 | A1 | 4/2018 | Vandike et al. |
| 2018/0092302 | A1 | 4/2018 | Vandike et al. |
| 2018/0303030 | A1 | 10/2018 | Heitmann et al. |
| 2018/0310474 | A1 | 11/2018 | Posselius et al. |
| 2018/0368318 | A1 | 12/2018 | Isaac et al. |
| 2019/0008091 | A1 | 1/2019 | Isaac et al. |
| 2019/0082593 | A1 | 3/2019 | Bollin et al. |
| 2019/0104681 | A1 | 4/2019 | Larson et al. |
| 2019/0174674 | A1 | 6/2019 | Diessner et al. |
| 2019/0350132 | A1 | 11/2019 | Issac et al. |
| 2020/0060082 | A1 | 2/2020 | Shinners et al. |
| 2020/0077591 | A1 | 3/2020 | Xu et al. |
| 2020/0107502 | A1 | 4/2020 | Mayerle et al. |
| 2020/0281118 | A1 | 9/2020 | Garrett |
| 2020/0296896 | A1 | 9/2020 | Mayerle |
| 2020/0323133 | A1 | 10/2020 | Anderson et al. |
| 2020/0396904 | A1 | 12/2020 | Faulkner et al. |
| 2021/0015039 | A1 | 1/2021 | Vandike et al. |
| 2021/0022289 | A1 | 1/2021 | Berry |
| 2021/0034867 | A1 | 2/2021 | Ferrari et al. |
| 2021/0127573 | A1 | 5/2021 | Mahieu et al. |
| 2021/0195839 | A1 | 7/2021 | Koch et al. |
| 2021/0282329 | A1 | 9/2021 | Hall |
| 2021/0400870 | A1 | 12/2021 | Sunil et al. |
| 2022/0110253 | A1 | 4/2022 | Anderson et al. |
| 2022/0132742 | A1 | 5/2022 | Faulkner et al. |
| 2022/0174873 | A1 | 6/2022 | Topmoller et al. |
| 2022/0232768 | A1 | 7/2022 | Craig |
| 2022/0346313 | A1 | 11/2022 | Passchyn et al. |
| 2022/0354054 | A1 | 11/2022 | Hermann |
| 2022/0361411 | A1 | 11/2022 | Mayerle et al. |
| 2022/0361412 | A1 | 11/2022 | Duquesne et al. |
| 2022/0369552 | A1 | 11/2022 | Christiansen et al. |
| 2022/0369553 | A1 | 11/2022 | Christiansen et al. |
| 2022/0369554 | A1 | 11/2022 | Christiansen et al. |
| 2022/0375228 | A1 | 11/2022 | Christiansen et al. |
| 2022/0394921 | A1 | 12/2022 | Missotten et al. |
| 2022/0394923 | A1 | 12/2022 | Christiansen et al. |
| 2022/0394924 | A1 | 12/2022 | Christiansen et al. |
| 2022/0394925 | A1 | 12/2022 | Missotten et al. |
| 2022/0397417 | A1 | 12/2022 | Christiansen et al. |
| 2022/0408642 | A1 | 12/2022 | Bojsen |
| 2023/0026898 | A1 | 1/2023 | Baes et al. |
| 2023/0028281 | A1 | 1/2023 | Lorriette |
| 2023/0037095 | A1 | 2/2023 | Mayerle |
| 2024/0288881 | A1 * | 8/2024 | De Beer .............. A01D 41/127 |

FOREIGN PATENT DOCUMENTS

| | | | |
|---|---|---|---|
| CN | 108093830 | A | 6/2018 |
| DE | 102014005904 | A1 | 10/2015 |
| DE | 102014014049 | A1 | 3/2016 |
| EP | 264764 | A2 | 4/1988 |
| EP | 0685151 | A1 | 12/1995 |
| EP | 1790207 | B1 | 5/2007 |
| EP | 1856966 | B1 | 11/2007 |
| EP | 1964465 | A2 | 9/2008 |
| EP | 2364587 | A1 | 9/2011 |
| EP | 2936962 | B1 | 10/2015 |
| EP | 2936961 | B1 | 8/2018 |
| EP | 3172959 | B1 | 9/2018 |
| EP | 3228174 | B1 | 3/2019 |
| EP | 3000302 | B1 | 8/2019 |
| EP | 3613272 | A1 | 2/2020 |
| EP | 3845050 | A1 | 7/2021 |
| EP | 4000373 | A1 | 5/2022 |
| EP | 4091422 | A1 | 11/2022 |
| EP | 4091423 | A1 | 11/2022 |
| EP | 4091424 | A1 | 11/2022 |
| EP | 4094564 | A1 | 11/2022 |
| EP | 1266553 | A2 | 12/2022 |
| EP | 4101282 | A1 | 12/2022 |
| EP | 4101283 | A1 | 12/2022 |
| EP | 4104665 | A1 | 12/2022 |
| EP | 4115723 | A1 | 1/2023 |
| EP | 4129044 | A1 | 2/2023 |
| GB | 2606740 | A | 11/2022 |
| GB | 2606740 | A1 | 11/2022 |
| GB | 2606741 | A | 11/2022 |
| IN | 202011006479 | A | 8/2021 |
| WO | 03005803 | A1 | 1/2003 |
| WO | 03039238 | A1 | 5/2003 |
| WO | 2017075002 | A1 | 5/2017 |
| WO | 18076428 | A1 | 5/2018 |
| WO | 18162699 | A1 | 9/2018 |
| WO | 2022243785 | A1 | 11/2022 |
| WO | 2022243786 | A1 | 11/2022 |

* cited by examiner

CROP CONDITION CATEGORIZATION SYSTEM AND METHOD

FIELD OF THE DISCLOSURE

The present description relates to agricultural machines and, in particular, to harvested crop processing systems of agricultural machines.

BACKGROUND OF THE DISCLOSURE

There are a variety of different types of agricultural machines. Some agricultural machines include combine harvesters, sugar cane harvesters, cotton harvesters, self-propelled forage harvesters, and windrowers. During operation, agricultural machines may thresh, chop, or otherwise process harvested crop. Various subsystems of agricultural machines require different amounts of power depending on parameters associated with the harvested crop, the agricultural machines, and other factors.

SUMMARY

In an illustrative implementation, a method of determining one or more crop conditions of harvested crop processed by an agricultural machine includes: moving the agricultural machine through a worksite to harvest crop; processing the harvested crop with at least one of: a threshing rotor in cooperation with at least one of a thresher basket and guide vanes, and a chopper rotor in cooperation with opposing knives; measuring one or more performance parameters associated with operation of the agricultural machine and providing the one or more measured performance parameters to a controller; receiving, via a controller, the one or more measured performance parameters and one or more machine parameters that affect performance parameters of the agricultural machine; and determining, via the controller, one or more crop conditions based on the one or more measured performance parameters and the one or more machine parameters received by the controller.

In some implementations, the one or more crop conditions includes a moisture level of the harvested crop. In some implementations, the one or more crop conditions includes a toughness level of the harvested crop.

In some implementations, the one or more machine parameters received by the controller includes or is indicative of a feed rate of harvested crop into the agricultural machine.

In some implementations, the one or more machine parameters received by the controller includes a position of the opposing knives. In some implementations, the one or more machine parameters received by the controller includes a rotational speed of the chopper rotor. In some implementations, the one or more machine parameters received by the controller includes a position of the guide vanes. In some implementations, the one or more machine parameters received by the controller includes a position of the thresher basket. In some implementations, the one or more machine parameters received by the controller includes a rotational speed of the threshing rotor.

In some implementations, the one or more measured performance parameters includes a force on the opposing knives. In some implementations, the one or more measured performance parameters includes or is indicative of a torque of the chopper rotor. In some implementations, the one or more measured performance parameters includes or is indicative of a torque of the threshing rotor. In some implementations, the one or more measured performance parameters includes a chop quality of the harvested crop.

In some implementations, processing the harvested crop includes: processing the harvested crop with both: the threshing rotor in cooperation with at least one of the thresher basket and the guides vanes, and the chopper rotor in cooperation with opposing knives. In some implementations, the method further includes: outputting, via a user interface operatively coupled to the controller, a categorical designation for the one or more crop conditions, wherein the categorical designation is associated with the one or more crop conditions being greater than, less than, or within a predetermined range for the one or more crop conditions.

In another illustrative implementation, a method of determining one or more crop conditions of harvested crop processed by an agricultural machine includes: moving the agricultural machine through a worksite to harvest crop; processing the harvested crop with at least one of: a threshing rotor in cooperation with at least one of a thresher basket and guide vanes, and a chopper rotor in cooperation with opposing knives; measuring a first performance parameter selected from the group consisting of: torque of the threshing rotor or an indication thereof, torque of the chopper rotor or an indication thereof, and force on the opposing knives; measuring a chop quality of the harvested crop; and determining, via a controller, one or more crop conditions based on the measured first performance parameter and the measured chop quality of the harvested crop, the one or more crop conditions including at least one of a moisture level of the harvested crop and a toughness level of the harvested crop.

In some implementations, measuring the chop quality of the harvested crop includes: measuring the length of the harvested crop after the harvested crop is processed by the chopper rotor in cooperation with the opposing knives. In some implementations, determining, via the controller, one or more crop conditions includes: determining, via the controller, a degree of processing associated with the harvested crop after the harvested crop is processed by the chopper rotor in cooperation with the opposing knives.

In another illustrative implementation, an agricultural machine for processing harvested crop includes: a cutting head configured to harvest crop; at least one of a threshing assembly and a crop debris routing assembly, the threshing assembly including a threshing rotor configured to rotate to process the harvested crop in cooperation with at least one of a threshing basket and guide vanes, and the crop debris routing assembly including opposing knives and a chopper rotor configured to rotate relative to the opposing knives to process the harvested crop; and a controller configured to receive one or more machine parameters and one or more performance parameters and determine at least one of a moisture level of the harvested crop and a toughness level of the harvested crop based on the received one or more machine parameters and one or more performance parameters; wherein the one or more machine parameters include at least one of: a feed rate of harvested crop into the cutting head or an indication thereof, a rotational speed of the threshing rotor, a position of at least one of the thresher basket and the guide vanes relative to the threshing rotor, a rotational speed of the chopper rotor, and a position of the opposing knives relative to the chopper rotor; and wherein the one or more performance parameters include at least one of: torque of the threshing rotor or an indication thereof, torque of the chopper rotor or an indication thereof, force on the opposing knives, and chop quality of the harvested crop.

In some implementations, the agricultural machine further includes at least one sensor positioned on the agricultural machine and configured to measure at least one of: torque of the threshing rotor or an indication thereof, torque of the chopper or an indication thereof, force on the opposing knives, and chop quality of the harvested crop.

In another illustrative implementation, an agricultural machine includes: a threshing assembly including a threshing rotor configured to rotate to process harvested crop in cooperation with at least one of a thresher basket and guide vanes; a crop debris routing assembly including opposing knives and a chopper rotor configured to rotate relative to the opposing knives to the process the harvested crop; and a controller configured to identify a relationship between a performance parameter that is associated with operation of the threshing assembly or the crop debris routing assembly and a performance-modifying parameter that affects the performance parameter of the agricultural machine, wherein the performance-modifying parameter is one of: (i) a machine parameter selected from the group consisting of: a feed rate of harvested crop into the agricultural machine, a rotational speed of the threshing rotor, a position of at least one of the thresher basket and the guide vanes, a rotational speed of the chopper rotor, and a position of the opposing knives, (ii) a crop condition selected from the group consisting of: a moisture level of the harvested crop and a toughness level of the harvested crop, and (iii) a chop quality of the harvested crop; wherein the controller is configured to adjust at least one machine parameter in the group of machine parameters to change an amount of power required by at least one of the threshing assembly and the crop debris routing assembly.

In some implementations, the performance parameter is associated with the threshing assembly. In some implementations, the performance parameter is a torque of or power required by the threshing rotor.

In some implementations, the performance parameter is associated with the crop debris routing assembly. In some implementations, the performance parameter is a torque of or power required by the chopper rotor. In some implementations, the performance parameter is a force on the opposing knives.

In some implementations, the agricultural machine further comprises a user interface operatively coupled to the controller; and the controller is configured to cause to be displayed on the user interface the identified relationship between the performance parameter that is associated with the threshing assembly or the crop debris routing assembly and the performance-modifying parameter.

In some implementations, the controller is configured to receive a measured value for a performance parameter; the controller is configured to compare the measured value for the performance parameter to a threshold value for the performance parameter; the controller is configured to adjust the at least one machine parameter in the group of machine parameters in response to determining that the measured value for the performance parameter exceeds the threshold value for the performance parameter; and the controller is configured to adjust the at least one machine parameter in the group of machine parameters based on the identified relationship between the performance parameter and the performance-modifying parameter.

In another illustrative implementation, a method of using performance parameters for an agricultural machine that includes a threshing assembly and a crop debris routing assembly includes: identifying, via a controller, a relationship between a performance parameter that is associated with operation of the threshing assembly or the crop debris routing assembly and a performance-modifying parameter that affects the performance parameter of the agricultural machine, wherein the performance-modifying parameter is one of: (i) a machine parameter selected from the group consisting of: a feed rate of harvested crop into the agricultural machine, a rotational speed of a threshing rotor of the threshing assembly, a position of at least one of a thresher basket and guides vanes, each of which interact with the threshing rotor to process harvested crop, a rotational speed of a chopper rotor of the crop debris routing assembly, and a position of opposing knives that interact with the chopper rotor to process harvested crop, (ii) a crop condition selected from the group consisting of: a moisture level of the harvested crop and a toughness level of the harvested crop, and (iii) a chop quality of the harvested crop; and adjusting at least one machine parameter in the group of machine parameters to change an amount of power required by at least one of the threshing assembly and the crop debris routing assembly based on the determined relationship between the performance parameter and the performance-modifying parameter.

In some implementations, the method further comprises: measuring values of the performance parameter during an agricultural operation; and determining, based on the identified relationship between the performance parameter and the performance-modifying parameter, that for the measured values of the performance parameter, an amount of change in a ratio of the performance parameter relative to the performance-modifying parameter exceeds a threshold amount of change in the ratio of the performance parameter relative to the performance-modifying parameter; wherein adjusting at least one machine parameter in the group of machine parameters includes: adjusting at least one machine parameter in the group of machine parameters in response to determining that, for the measured values of the performance parameter, the amount of change in the ratio of the performance parameter relative to the performance-modifying parameter exceeds the threshold amount of change in the ratio of the performance parameter relative to the performance-modifying parameter.

In some implementations, the method further comprises: measuring a value of the performance parameter during an agricultural operation; and determining that, at the measured value, the performance parameter exceeds a threshold value for the performance parameter; wherein adjusting at least one machine parameter in the group of machine parameters includes: adjusting at least one machine parameter in the group of machine parameters based on the determined relationship between the performance parameter and the performance-modifying parameter and in response to determining that, at the measured value, the performance parameter exceeds a corresponding threshold value for the performance parameter.

In some implementations, the method further comprises: displaying the identified relationship between the performance parameter and the performance-modifying parameter via a user interface operatively coupled to the controller; and receiving, via the controller, a set point for the machine parameter associated with the identified relationship, the set point being provided to the controller via the user interface; wherein adjusting at least one machine parameter in the group of machine parameters includes: adjusting the one or more machine parameters for which the one or more set points are received.

In some implementations, the relationship identified via the controller between the performance parameter and the performance-modifying parameter is a first relationship, the performance parameter is a first performance parameter, and the performance-modifying parameter is a first performance-modifying parameter. In some implementations, the method further comprises: identifying, via a controller, a second relationship between a second performance parameter and a second performance-modifying parameter; wherein at least one of the second performance parameter and the second performance-modifying parameter is different from the first performance parameter and the first performance-modifying parameter, respectively; wherein the second performance-modifying parameter includes: (i) a machine parameter selected from the group consisting of: a feed rate of harvested crop into the agricultural machine, a rotational speed of the threshing rotor, a position of the thresher basket, a rotational speed of the chopper rotor, and a position of the opposing knives; (ii) a crop condition selected from the group consisting of: a moisture level of the harvested crop and a toughness level of the harvested crop; and (iii) a chop quality of the harvested crop. In some implementations, the method further comprises: displaying the first relationship and the second relationship via a user interface operatively coupled to the controller; and receiving an indication, via the controller, that at least one of the first relationship and the second relationship or at least one of the first performance-modifying parameter and the second performance-modifying parameter has been selected by a user; and wherein adjusting at least one machine parameter in the group of machine parameters includes: adjusting any machine parameter that is associated with the received indication.

In some implementations, the method further comprises: displaying, via a user interface operatively coupled to the controller, a recommendation that a user select at least one machine parameter in the group of machine parameters for adjustment.

In some implementations, the method further comprises: measuring a value of the performance parameter; storing the measured value of the performance parameter and a corresponding value for the performance-modifying parameter on a memory, wherein the corresponding value for the performance-modifying parameter is a value of the performance-modifying parameter at a time associated with the measured value of performance parameter; and wherein identifying, via a controller, the relationship between the performance parameter and the performance-modifying parameter further includes: accessing the measured value of the performance parameter and the corresponding value for the performance-modifying parameter that are stored on the memory.

In some implementations, storing the measured value of the performance parameter is performed repeatedly at a constant time interval. In some implementations, storing the measured value of the performance parameter is performed in response to determining, via the controller, that an amount of crop harvested or area traversed exceeds a threshold amount of harvested crop or area traversed. In some implementations, storing the measured value of the performance parameter is performed in response to determining, via the controller, that a value of the measured performance parameter exceeds a predetermined range for the performance parameter. In some implementations, storing the measured value of the performance parameter is performed in response to determining, via the controller, that a variability of the measured values of the performance parameter exceeds a threshold for variability of the performance parameter.

In another illustrative implementation, an agricultural machine includes: a threshing assembly including a threshing rotor configured to rotate to process harvested crop in cooperation with at least one of a threshing basket and guide vanes; a crop debris routing assembly including opposing knives and a chopper rotor configured to rotate relative to the opposing knives to the process the harvested crop; and a controller configured to identify a relationship between a performance parameter that is associated with operation of the threshing assembly or the crop debris routing assembly and at least one performance-modifying parameter that affects the performance parameter of the agricultural machine, the performance-modifying parameter selected from the group consisting of: a feed rate of harvested crop into the agricultural machine, a rotational speed of the threshing rotor, a position of the thresher basket, a rotational speed of the chopper rotor, a position of the opposing knives, a moisture level of the harvested crop, a toughness level of the harvested crop, and a chop quality of the harvested crop.

In another illustrative embodiment, a crop debris routing assembly of an agricultural machine for processing harvested crop, comprises a chopper rotor configured to rotate about a chopper axis, the chopper rotor including a plurality of chopper knives; opposing knives extending toward the chopper rotor and spaced from the chopper knives; at least one load cell configured to measure a force applied to the opposing knives as harvested crop passes through the crop debris routing assembly; and a controller configured to: receive a signal from the at least one load cell indicative of the measured force applied to the opposing knives, and determine an amount of power required by the chopper rotor based on the measured force applied to the opposing knives and a rotational speed of the chopper rotor. In some implementations, the opposing knives are configured to extend and retract relative to the chopper axis.

In some implementations, the controller is configured to determine the amount of power required by the chopper rotor based on the measured force applied to the opposing knives, the rotational speed of the chopper rotor, and a distance between a portion of the opposing knives and a center point of the chopper rotor through which the chopper axis extends. In some implementations, the controller is configured to determine the amount of power required by the chopper rotor based on the measured force applied to the opposing knives, the rotational speed of the chopper rotor, the distance between a portion of the opposing knives and the center point of the chopper rotor, and a distance between the portion of the opposing knives and the at least one load cell. In some implementations, the controller is configured to determine a corrected power requirement of the chopper rotor based on the determined amount of power required by the chopper rotor and a position of the opposing knives relative to the chopper rotor.

In some implementations, the controller is configured to determine the amount of power required by the chopper rotor based on the measured force applied to the opposing knives, the rotational speed of the chopper rotor, and an amount of harvested crop passing through the crop debris routing assembly. In some implementations, the controller is configured to receive an indication of a grain yield from the harvest crop; and the controller is configured to determine the amount of harvested crop passing through the crop debris routing assembly based on the received indication. In some implementations, the controller is configured to receive an indication of a feed rate of harvested crop into the agricultural machine; and the controller is configured to determine the amount of harvested crop passing through the crop debris routing assembly based on the received indication.

In some implementations, the controller is configured to receive an indication of power consumption of a component of the agricultural machine other than the chopper rotor; the controller is configured to determine the amount of harvested crop passing through the crop debris routing assembly based on the received indication. In some implementations, the component of the agricultural machine other than the chopper rotor is a threshing rotor that is configured to rotate to process harvested crop in cooperation with at least one of a thresher basket positioned and guide vanes.

In some implementations, the controller is configured to determine the amount of power required by the chopper rotor based on the measured force applied to the opposing knives, the rotational speed of the chopper rotor, and a moisture level of the harvested crop. In some implementations, the controller is configured to determine the amount of power required by the chopper rotor based on the measured force applied to the opposing knives, the rotational speed of the chopper rotor, and a toughness level of the harvested crop. In some implementations, the controller is configured to determine the amount of power required by the chopper rotor based on the measured force applied to the opposing knives, the rotational speed of the chopper rotor, and a type of crop processed by the agricultural machine.

In another illustrative implementation, a crop debris routing assembly for processing harvested crop in an agricultural machine includes: a chopper rotor configured to rotate about a chopper axis, the chopper rotor including a plurality of chopper knives; opposing knives extending toward the chopper rotor and spaced from the chopper knives; at least one load cell configured to measure a force applied to the opposing knives as harvested crop passes through the crop debris routing assembly; and a controller configured to: receive a signal from the at least one load cell indicative of the measured force applied to the opposing knives, and determine a torque of the chopper rotor based on the measure force applied to the opposing knives and a distance between a portion of the opposing knives and a center point of the chopper rotor through which the chopper axis extends.

In some implementations, the controller is configured to determine the torque of the chopper rotor based on the measured force applied to the opposing knives, the distance between the portion of the opposing knives and the center point of the chopper rotor, and at least one of: an amount of harvested crop passing through the crop debris routing assembly, a crop condition from the group comprised of: a moisture level of the harvested crop and a toughness of the harvested crop, a type of crop processed by the agricultural machine, and a chop quality of the harvested crop that exits the crop debris routing assembly. In some implementations, the controller is configured to determine a corrected torque of the chopper rotor based on the determined torque of the chopper rotor and a position of the opposing knives relative to the chopper rotor.

In another illustrative implementation, a method for determining power required by a crop debris routing assembly of an agricultural machine includes: rotating a chopper rotor about a chopper axis relative to opposing knives that extend toward the chopper rotor; measuring, via at least one load cell, a force applied to the opposing knives as harvested crop passes through the crop debris routing assembly; receiving the measured force applied to the opposing knives; and determining an amount of power required by the chopper rotor based on the measured force applied to the opposing knives and a rotational speed of the chopper rotor.

In some implementations, determining the amount of power required by the chopper rotor includes determining the amount of power required by the chopper rotor based on the measured force applied to the opposing knives, the rotational speed of the chopper rotor, and a distance between a portion of the opposing knives and a center point of the chopper rotor through which the chopper axis passes. In some implementations, the method further comprises: determining a corrected power requirement of the chopper rotor based on the determined amount of power required by the chopper rotor and a position of the opposing knives relative to the chopper rotor.

In some implementations, determining the amount of power required by the chopper rotor includes determining the amount of power required by the chopper rotor based on the measured force applied to the opposing knives, the rotational speed of the chopper rotor, and an amount of harvested crop passing through the crop debris routing assembly.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
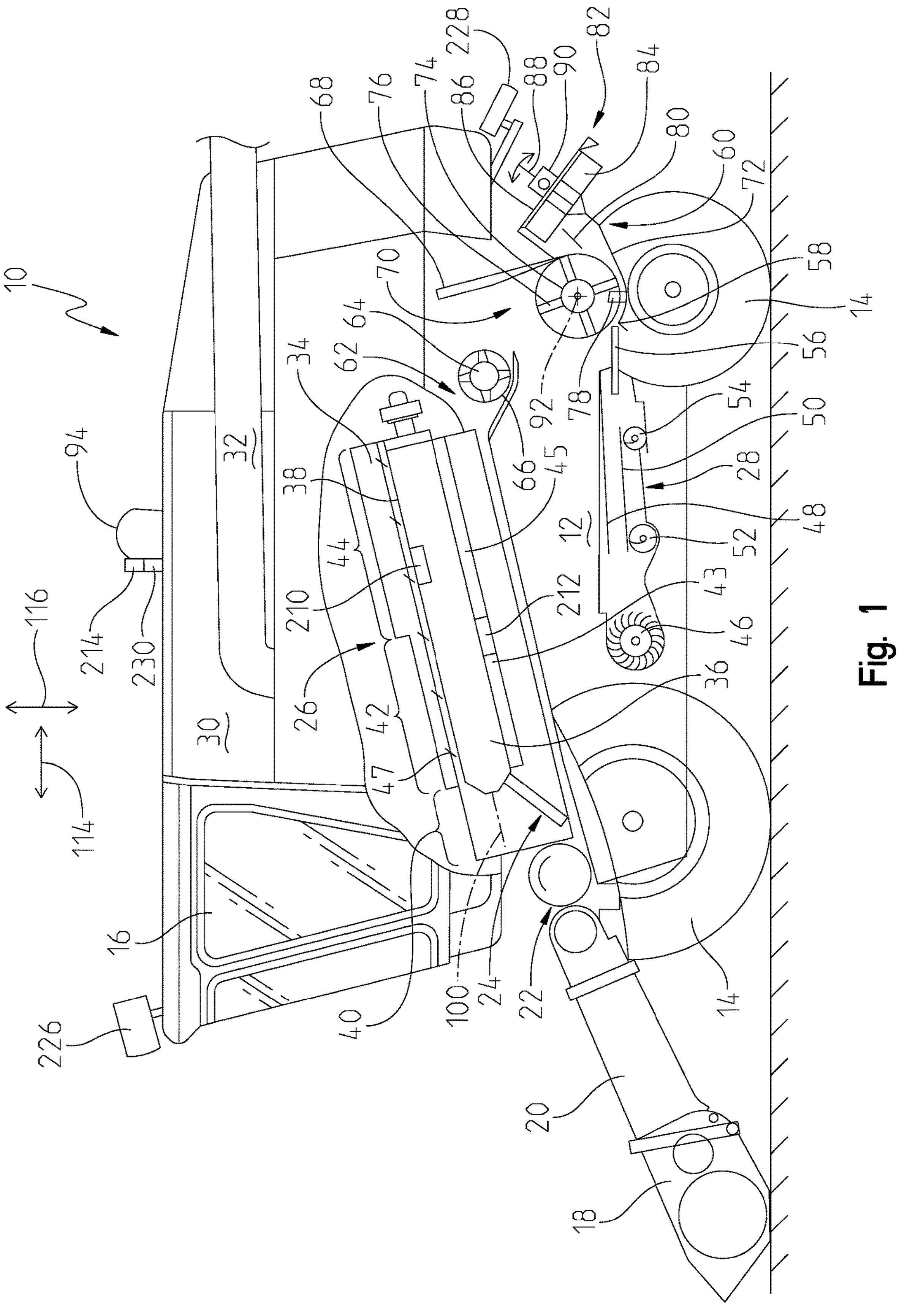
FIG. 1 is a side view of an example agricultural machine configured to harvest and process crop.

In FIG. 1, an implementation of an agricultural machine 10 is shown. The agricultural machine 10 includes a frame 12 and one or more ground engaging mechanism, such as wheels 14 or tracks, that are in contact with an underlying ground surface. In the illustrative implementation, the wheels 14 are coupled to the frame 12 and are used for movement of the agricultural machine 10 in a forward operating direction (which is to the left in FIG. 1) and in other directions. The agricultural machine 10 includes a prime mover 108 (see FIG. 6), such as an engine, for propulsion of the agricultural machine 10. In some implementations, operation of the agricultural machine 10 is controlled from an operator's cab 16. The operator's cab 16 may include any number of controls for controlling operation of the agricultural machine 10, such as a user interface. In some implementations, operation of the agricultural machine 10 may be conducted by a human operator in the operator's cab 16, a remote human operator, or an automated system.

Figure 6:
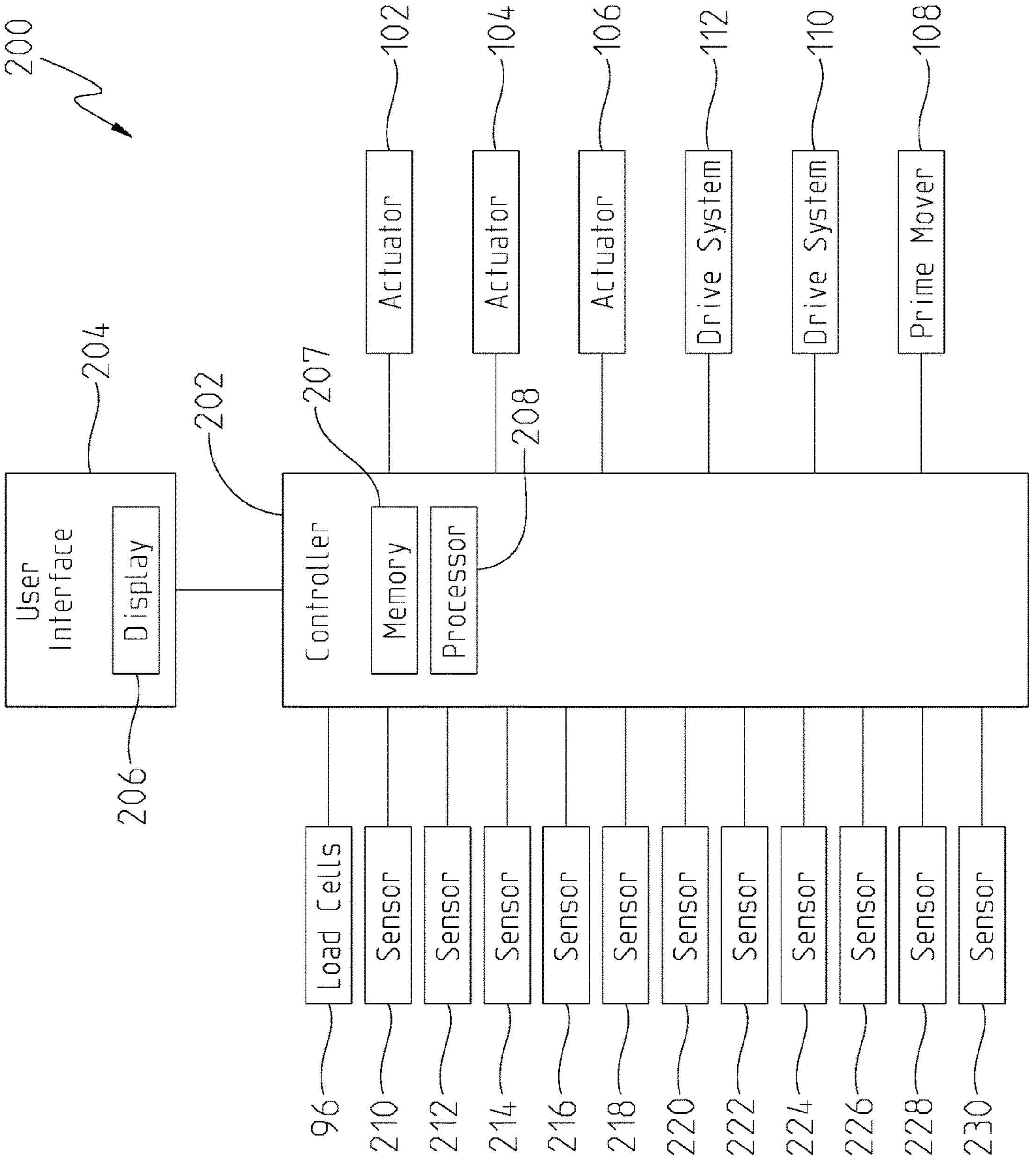
FIG. 6 is a diagrammatic view of an example control system configured to measure, determine, receive, and adjust performance parameters and performance-modifying parameters.

A cutting head 18 is disposed at a forward end of the agricultural machine 10 and is used to harvest crop and to conduct harvested crop to a slope conveyor 20. The term harvested crop as used herein includes grain (e.g., corn, wheat, soybeans, rice, oats) and material other than grain (MOG). The slope conveyor 20 conducts the harvested crop to a guide drum 22. The guide drum 22 guides the harvested crop to an inlet 24 of a threshing assembly 26, as shown in FIG. 1. The threshing assembly 26 includes a housing 34 and one or more threshing rotors. A single threshing rotor 36 is shown in FIG. 1. The threshing rotor 36 includes a drum 38 arranged along a threshing axis 100, and the threshing rotor 36 rotates about the threshing axis 100. In the illustrative implementation, the threshing rotor 36 is powered by a drive system 110, as shown in FIG. 6, which may include a motor or a belt assembly driven by an engine. In some implementations, the threshing assembly 26 includes a sensor 210 configured to measure a torque of the threshing rotor 36, which may be used by a controller 202 (shown in FIG. 6) to determine an amount of power required by the threshing rotor 36. In some embodiments, the sensor 210 measures a parameter indicative of the torque of the threshing rotor 36, but does not measure the torque directly. For example, a fluid pressure, such a hydraulic or pneumatic pressure, that is used to drive the threshing rotor 36 can be measured, and the measured pressure can be used to determine the torque of the threshing rotor 36. For example, the torque may be determined via a controller 202 that is shown in FIG. 6.

The threshing assembly 26 further includes a charging section 40, a threshing section 42, and a separating section 44. The charging section 40 is arranged at a front end of the threshing assembly 26, the separating section 44 is arranged at a rear end of the threshing assembly 26, and the threshing section 42 is arranged between the charging section 40 and the separating section 44. The threshing assembly 26 further includes a thresher basket 43 that is positioned in the threshing section 42 and below the threshing rotor 36, guide vanes 47 that are positioned above the threshing rotor 36, and a separating grate 45 that is positioned in the separating section 44 and below the threshing rotor 36. In some implementations, one or more of the thresher basket 43, the separating grate 45, and the guide vanes 47 are movable relative to the threshing rotor 36, for example, via an actuator 102 shown in FIG. 6. In some implementations, separate actuators may be used for movement of the thresher basket 43, the separating grate 45, and the guide vanes 47. A position of one or more of the thresher basket 43, the separating grate 45, and the guide vanes 47 may be received (e.g., as a measurement, set point, or stored value) or determined by the controller 202 that is shown in FIG. 6. In one example, the position of one or more of the thresher basket 43, the separating grate 45, and the guide vanes 47 may be measured via a sensor 212 of the threshing assembly 26 and provided to the controller 202. In some implementations, the positions of the thresher basket 43, the separating grate 45, and the guide vanes 47 may be measured by separate sensors.

In the illustrative implementation, the guide vanes 47 guide harvested crop rearwardly through the threshing assembly 26, and the harvested crop is separated and expands as it engages with the guide vanes 47. Harvested crop falls through the thresher basket 43 and through the separating grate 45. The harvested crop may be directed to a clean crop routing assembly 28 with a blower 46 and sieves 48, 50 with louvers. The sieves 48, 50 can be oscillated in a fore-and-aft direction indicated by the arrow 114. The clean crop routing assembly 28 removes MOG and guides grain over a screw conveyor 52 to a grain elevator 94. The grain elevator 94 deposits the grain in a grain tank 30, as shown in FIG. 1. The agricultural machine 10 includes a sensor 214 that is, for example, positioned on the grain elevator 94 and configured to measure a grain yield of the harvested crop. In some implementations, the agricultural machine 10 includes a sensor 230 that is positioned along a path of the harvested crop, for example, in the agricultural machine 10, and the sensor is configured to measure a moisture level of the harvested crop. The grain in the grain tank 30 can be unloaded by means of an unloading screw conveyor 32 to a grain wagon, trailer, or truck, for example.

Harvested crop remaining at a rear end of the sieve 50 is again transported to the threshing assembly 26 by a screw conveyor 54 where the harvested crop is reprocessed by the threshing assembly 26. Harvested crop remaining at a rear end of the sieve 48 is conveyed by an oscillating sheet conveyor 56 to a lower inlet 58 of a crop debris routing assembly 60. Harvested crop at the threshing assembly 26 is processed by the separating section 44 resulting in straw being separated from other material of the harvested crop. The straw is ejected through an outlet 62 of the threshing assembly 26 and conducted to an ejection drum 64. The ejection drum 64 interacts with a sheet 66 arranged underneath the ejection drum 64 to move the straw rearwardly. A wall 68 is located to the rear of the ejection drum 64 and guides the straw into an upper inlet 70 of the crop debris routing assembly 60.

As shown in FIG. 1-5, the crop debris routing assembly 60 includes a chopper housing 72 and a chopper rotor 74 arranged in the chopper housing 72. The chopper rotor 74 rotates in a counter-clockwise direction, for example, about a chopper axis 92. In the illustrative implementation, the chopper axis 92 extends in a lateral direction perpendicular to the fore-and-aft direction 114. The chopper rotor 74 includes a plurality of chopper knives 76 extending to a circumference of the chopper rotor 74. The crop debris routing assembly 60 further includes opposing knives 78 (one of which is shown in FIGS. 1-5) that are coupled to the chopper housing 72. The opposing knives 78 are configured to extend from the chopper housing 72 toward the chopper rotor 74. In some arrangements, the opposing knives 78 may be spaced laterally apart from and interleaved with the chopper knives 76. The chopper knives 76 cooperate with the opposing knives 78 to chop the straw into smaller pieces.

In the illustrative implementation, the chopper rotor 74 is powered by a drive system 112, as shown in FIG. 6, which may include a motor or a belt assembly driven by an engine. In some implementations, as shown in FIGS. 2-5, the crop debris routing assembly 60 includes a sensor 216 configured to measure a torque of the chopper rotor 74. In some embodiments, the sensor 216 measures a parameter indicative of the torque of the chopper rotor 74, but does not measure the torque directly. For example, a fluid pressure, such a hydraulic or pneumatic pressure, that is used to drive the chopper rotor 74 can be measured, and the measured pressure can be used to determine the torque of the chopper rotor 74. For example, the torque may be determined via the controller 202 that is shown in FIG. 6.

In some implementations, the controller 202 determines an amount of power required by the chopper rotor 74 based on the measured or determined torque of the chopper rotor 74. Using the measured or determined torque of the chopper rotor 74 to determine the power required by the chopper rotor 74 is an example of directly determining the power required by the chopper rotor 74.

The crop debris routing assembly 60 further includes one or more load cells 96, one of which is shown in FIGS. 2-5. The load cells 96 are configured to measure the force on the opposing knives 78 as harvested crop passes through the crop debris routing assembly 60. The force on the opposing knives 78 may be used to determine the power required by the chopper rotor 74. Using the force on the opposing knives 78 to determine the power required by the chopper rotor 74 is an example of indirectly determining the power required by the chopper rotor 74. A method 900 of indirectly determining an amount of power required by the chopper rotor 74 based on a measured force applied to the opposing knives 78 is described herein subsequent to further description of relevant components. A similar method 1000 may be used to indirectly determine a torque of the chopper rotor 74 as described herein.

Figure 2:
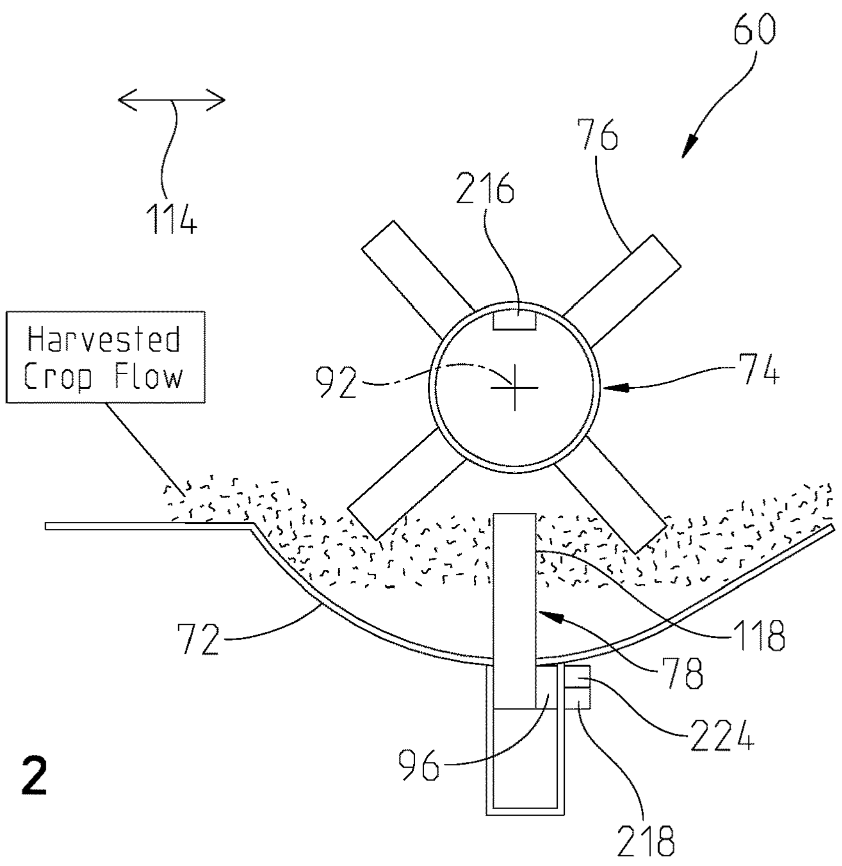
FIG. 2 is a diagrammatic view of a crop debris routing assembly of the agricultural machine of FIG. 1 showing a chopper rotor and an opposing knife engaged with harvested crop passing through the crop debris routing assembly.
Figure 3:
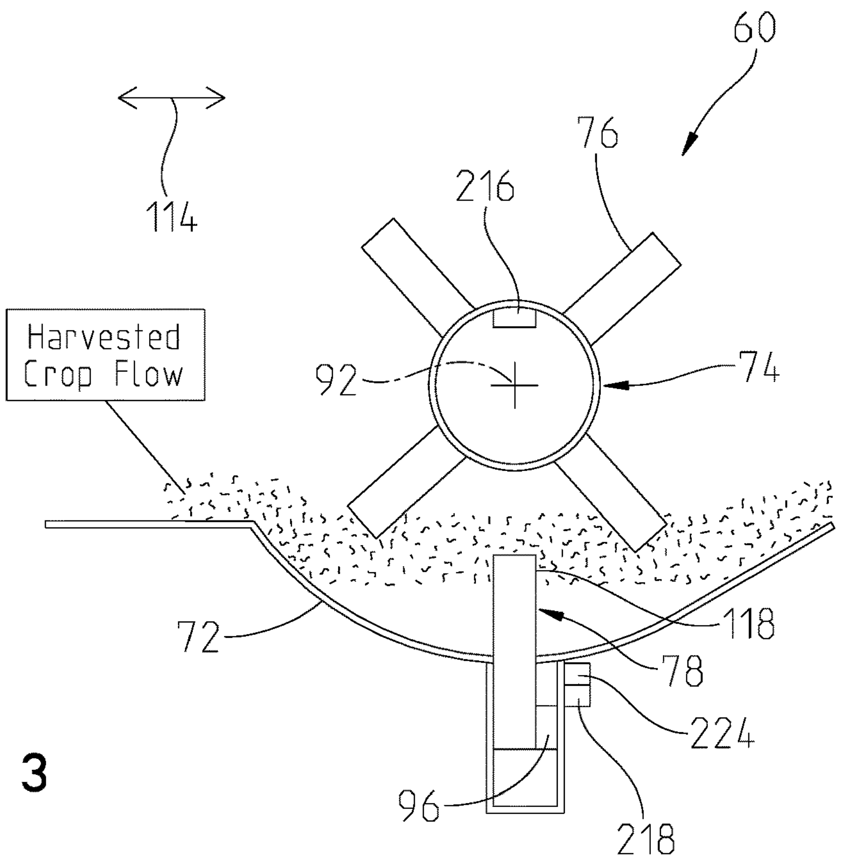
FIG. 3 is a diagrammatic view of the crop debris routing assembly of FIG. 2 showing that the opposing knife is moveable relative to the chopper rotor.

In the illustrative implementation, as shown in FIGS. 2-3, the opposing knives 78 are movable relative to the chopper housing 72 and relative to the chopper rotor 74 in a vertical direction, for example, indicated by the arrow 116. It should be appreciated that, in some implementations, the opposing knives 78 do not move entirely in the vertical direction 116, but move in a direction that has a vertical component of extension. In the illustrative implementation, an actuator 104 that is shown in FIG. 6, causes movement of the opposing knives 78. In some implementations, a distance between a portion of the opposing knives 78 (e.g., at a location 118 shown in FIGS. 2-5) and a portion of the chopper rotor 74 (e.g., at the chopper axis 92) may be received (e.g., as a measurement, set point, or stored value) or determined by the controller 202. In one example, the distance between the portion of the opposing knives 78 and the portion of the chopper rotor 74 may be measured via a sensor 224 of the crop debris routing assembly 60 and provided to the controller 202.

In some implementations, a position of the opposing knives 78 relative to the chopper rotor 74 may be referred to as the degree of engagement of the opposing knives 78 with the chopper rotor 74. As the opposing knives 78 extend nearer to the chopper axis 92, the degree of engagement increases. As the opposing knives 78 retract away from the chopper axis 92, the degree of engagement decreases.

Figure 4:
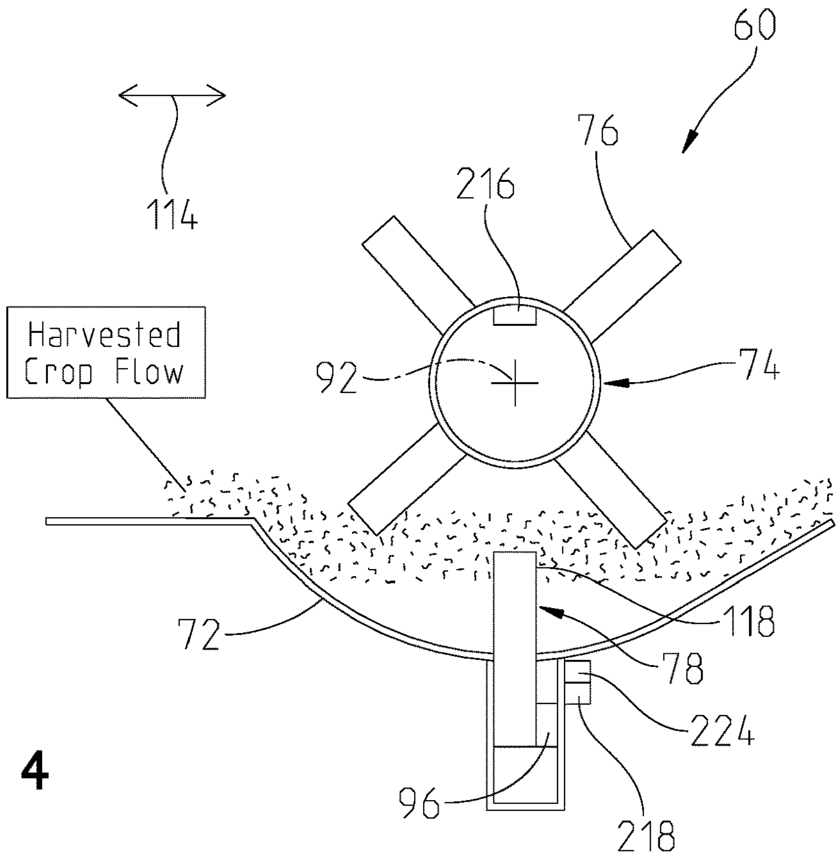
FIG. 4 is the same diagrammatic view of the crop debris routing assembly as shown in FIG. 3.
Figure 5:
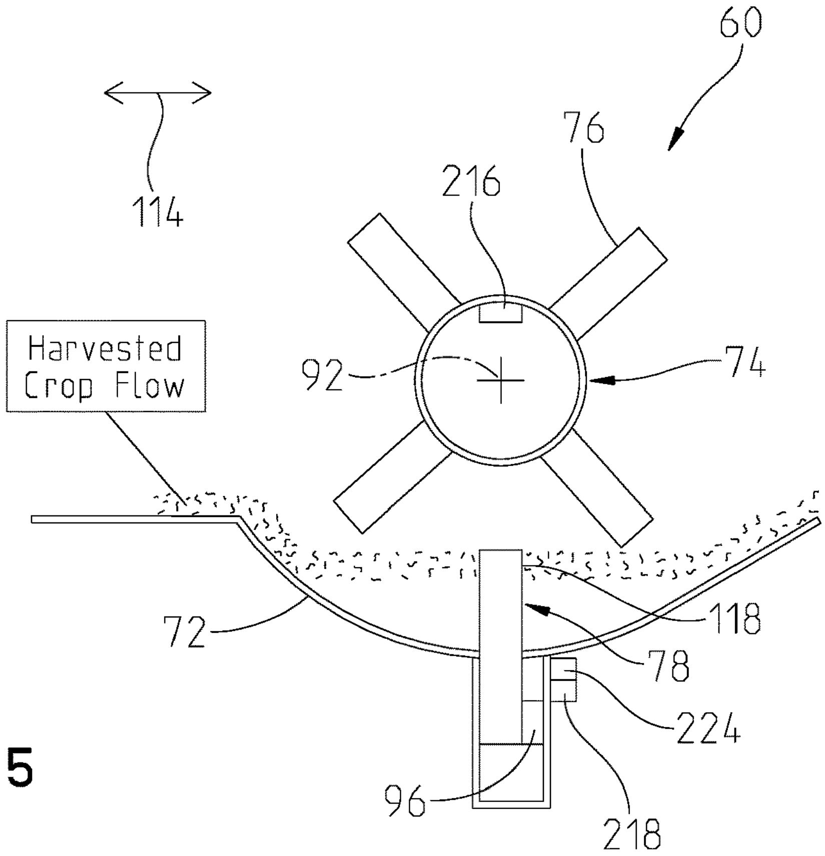
FIG. 5 is a diagrammatic view of the crop debris routing assembly of FIG. 4 showing a lesser amount of harvested crop passing through the crop debris routing assembly relative to FIG. 4.

As shown in FIGS. 2-3, as the degree of engagement of varies, the opposing knives 78 tend to interact with different amounts of harvested crop passing through the crop debris routing assembly 60. However, as shown in FIGS. 4-5, the amount of harvested crop passing through the crop debris routing assembly 60 may vary as well. Relationships exist between the power required by (or torque of) the chopper rotor 74 and the force on the opposing knives 78. The degree of engagement of the opposing knives 78 and the amount of harvested crop passing through the crop debris routing assembly 60 are factors that may affect relationships between the power required by (or torque of) the chopper rotor 74 and the force on the opposing knives 78. Other factors that affect such relationships include crop conditions of the harvested crop (e.g., moisture level and toughness level of the harvested crop), the type of crop being harvested (e.g., corn, soybeans, wheat), and a chop quality of harvested crop that exits the crop debris routing assembly 60.

As shown in FIGS. 2-3, in the illustrative implementation, the load cells 96 move with the opposing knives 78 as the opposing knives 78 extend and retract relative to the chopper housing 72, for example. In some implementations, a vertical distance between a portion of the opposing knives 78 (e.g., at the location 118) and the load cells 96 may be received (e.g., as a measurement, set point, or stored value) or determined by the controller 202. In one example, the vertical distance between the portion of the opposing knives 78 (e.g., at the location 118) and the load cells 96 may be measured via a sensor 218 of the crop debris routing assembly 60, which is shown in FIGS. 2-6, and provided to the controller 202.

Referring again to FIG. 1, in some implementations, one or more spreaders are provided downstream of an outlet 80 of the crop debris routing assembly 60. One spreader 82 is shown in FIG. 1. The spreader 82 includes a number of impeller blades 84, each of which is connected to a disk 86 that rotates about a central axis 88. Rotation of the disk 86 rotates the impeller blades 84. Chopped straw is moved through the outlet 80 of the crop debris routing assembly 60 to the spreader 82. Rotation of the impeller blades 84 spreads the chopped straw as the chopped straw exits the agricultural machine 10. The agricultural machine 10 includes a sensor 228, such as a camera, that is positioned at the rear end of the agricultural machine 10. For example, the sensor 228 may be positioned on or above the spreader 82 or on a component of the crop debris routing assembly 60, as shown in FIG. 1. The sensor 228 is configured to measure the chop quality of harvested crop that exits the agricultural machine 10.

Various parameters are associated with processing harvested crop. Such parameters are described herein with illustrative reference to the agricultural machine 10; however, it should be appreciated that the parameters and their associated uses may be applicable to any agricultural machine that processes harvested crop. Performance parameters are an indication of how the agricultural machine 10 is operating, and performance-modifying parameters are parameters that affect the performance parameters. In some instances, a parameter (e.g., chop quality) may function as a performance parameter in one context and as a performance-modifying parameter in another context.

In the illustrative implementation, performance-modifying parameters include: machine parameters, crop conditions, and chop quality of harvested crop. The machine parameters are associated with the agricultural machine 10, for example, and may be adjustable via the controller 202. The machine parameters include: a feed rate of harvested crop into the agricultural machine 10, a rotational speed of the threshing rotor 36, a position of one or more of the thresher basket 43, the separating grate 45, and the guide vanes 47 (e.g., relative to the threshing rotor 36 or threshing axis 100), a rotational speed of the chopper rotor 74, and a position of the opposing knives 78 (e.g., relative to the chopper rotor 74 or chopper axis 92). The rotational speeds of the threshing rotor 36 and the chopper rotor 74 may be received (e.g., as a measurement, set point, or stored value) or determined by the controller 202. In some implementations, the rotational speeds of the threshing rotor 36 and the chopper rotor 74 may be measured via sensors 220, 222, respectively, and provided to the controller 202. In the illustrative implementation, the threshing assembly 26 includes the sensor 220, and the crop debris routing assembly 60 includes the sensor 222. The sensors 220, 222 are operatively coupled to the controller 202 as shown in FIG. 6.

During agricultural operations, such as harvesting operations, crop is ingested by the cutting head 18 of the agricultural machine 10. The feed rate of harvested crop into the agricultural machine 10 is determined by a lateral length of the cutting head 18, the speed of agricultural machine 10 during a harvesting operation, the height of the cutting head 18 above an underlying ground surface, and a biomass yield of the harvested crop (that is, for example, correlated with the grain yield of the harvested crop). The controller 202 may adjust the feed rate by altering the speed of the agricultural machine 10, via communication to the prime mover 108. The controller 202 may also adjust the feed rate via communication to the actuator 106, shown in FIG. 6, that is configured to change the height of the cutting head 18 relative to the underlying ground surface. In some implementations, the feed rate of harvested crop into the agricultural machine 10 may be received (e.g., as a measurement, set point, or stored value) or determined by the controller 202. In some implementations, the feed rate of harvested crop into the agricultural machine 10 or an indication thereof may be measured via a sensor 226, which is illustratively embodied as a camera that is positioned on the cab 16 as shown in FIG. 1, and provided to the controller 202. In some implementations, the measured grain yield of the harvested crop, the measured pressure used to drive the threshing rotor 36, or both may be used to determine feed rate of harvested crop into the agricultural machine 10.

Crop conditions are characteristics associated with the harvested crop, such as moisture level and toughness level of the harvested crop. The moisture level is an indication of the water content of the harvested crop, and the toughness level is an indication of the degree of difficulty of breaking apart the harvested crop. Moisture level, toughness level, or both may be numeric values, ranges of values, or categorical designations, such as low, medium, or high. The values, ranges of values, and categorical designations may be time-referenced. In some implementations, such as methods 300, 400 described herein, the moisture level and toughness level of the harvested crop may be determined by the controller 202 based on one or more machine parameters and one or more performance parameters.

Chop quality is an indication of length or another processing characteristic of a portion of the harvested crop, such as the straw. Chop quality may be a numeric value indicating the length of the straw (e.g., average length) or a categorical designation, such as under-processed, over-processed, or properly-processed. Categorical designations may take the form of visual output (e.g., text or color), audio output, haptic output, or another output. Such output may be provided by a user interface 204 that is shown in FIG. 6. As described, the chop quality of harvested crop is measurable via the sensor 228 of the agricultural machine 10.

In the illustrative implementation, the performance parameters of the agricultural machine 10 are associated with operation of the threshing assembly 26, the crop debris routing assembly 60, or both. For example, the performance parameters include the torque of or power required by the threshing rotor 36, the pressure that is used to drive the threshing rotor 36 (which is an indication of the torque of the threshing rotor 36), the torque of or power required by the chopper rotor 74, the pressure that is used to drive the chopper rotor 74 (which is an indication of the torque of the chopper rotor 74), and the force on the opposing knives 78 as harvested crop passes through the crop debris routing assembly 60. In some implementations, the chop quality of harvested crop is also a performance parameter.

Performance parameters and performance-modifying parameters may be received by the controller 202. For example, the performance parameters and performance-modifying parameters may be measured by one or more sensors described herein and provided to the controller 202, provided to the controller 202 as a set point (e.g., via the user interface 204), or otherwise stored in memory 207 that is included in or accessible by the controller 202. In the illustrative implementation, the controller 202 is included in an example control system 200 that is described below.

Referring now to FIG. 6, the example control system 200 is shown. The control system 200 includes the controller 202 and further includes the load cells 96 and the sensors 210, 212, 214, 216, 218, 220, 222, 224 226, 228, 230, each of which are operatively coupled to the controller 202 and configured to send signals thereto that are indicative of measurements. The control system 200 also includes the user interface 204, which is operatively coupled to the controller 202. The user interface 204 is configured to send signals to the controller 202 indicative of information supplied to the user interface 204 by a user, and the user interface 204 is configured to receive signals from the controller 202 indicative of information to be output to a user. In some implementations, the user interface 204 includes one or more speakers for providing audio output and one or more microphones for receiving audio input. In some implementations, the user interface 204 includes one or more components for providing haptic output, receiving haptic input, or both. In some implementations, the user interface may include movable components for user input such as a lever, dial, button, slider, or the like. In some implementations, the user interface 204 includes one or more displays 206 for providing visual output and receiving user input. The controller 202 is operatively coupled to the actuators 102, 104, 106, which are configured to cause movement or apply force to components of the agricultural machine 10 that results in adjustment of one or more machine parameters. The controller 202 is operatively coupled to the prime mover 108 and the drive systems 110, 112 and configured to adjust the output thereof.

The control system 200 includes one or more memories 207 included in or accessible by the controller 202 and one or more processors 208 included in or accessible by the controller 202. The one or more processors 208 are configured to execute instructions (e.g., one or more algorithms) stored on the one or more memories 207. The controller 202 may be a single controller or a plurality of controllers operatively coupled to one another. The controller 202 may be positioned on the agricultural machine 10 or positioned remotely, away from the agricultural machine 10. The controller 202 may be coupled via a wired connection or wirelessly to other components of the agricultural machine 10 and to one or more remote devices. In some instances, the controller 202 may be connected wirelessly via Wi-Fi, Bluetooth, Near Field Communication, or another wireless communication protocol to other components of the agricultural machine 10 and to one or more remote devices.

Figure 7:
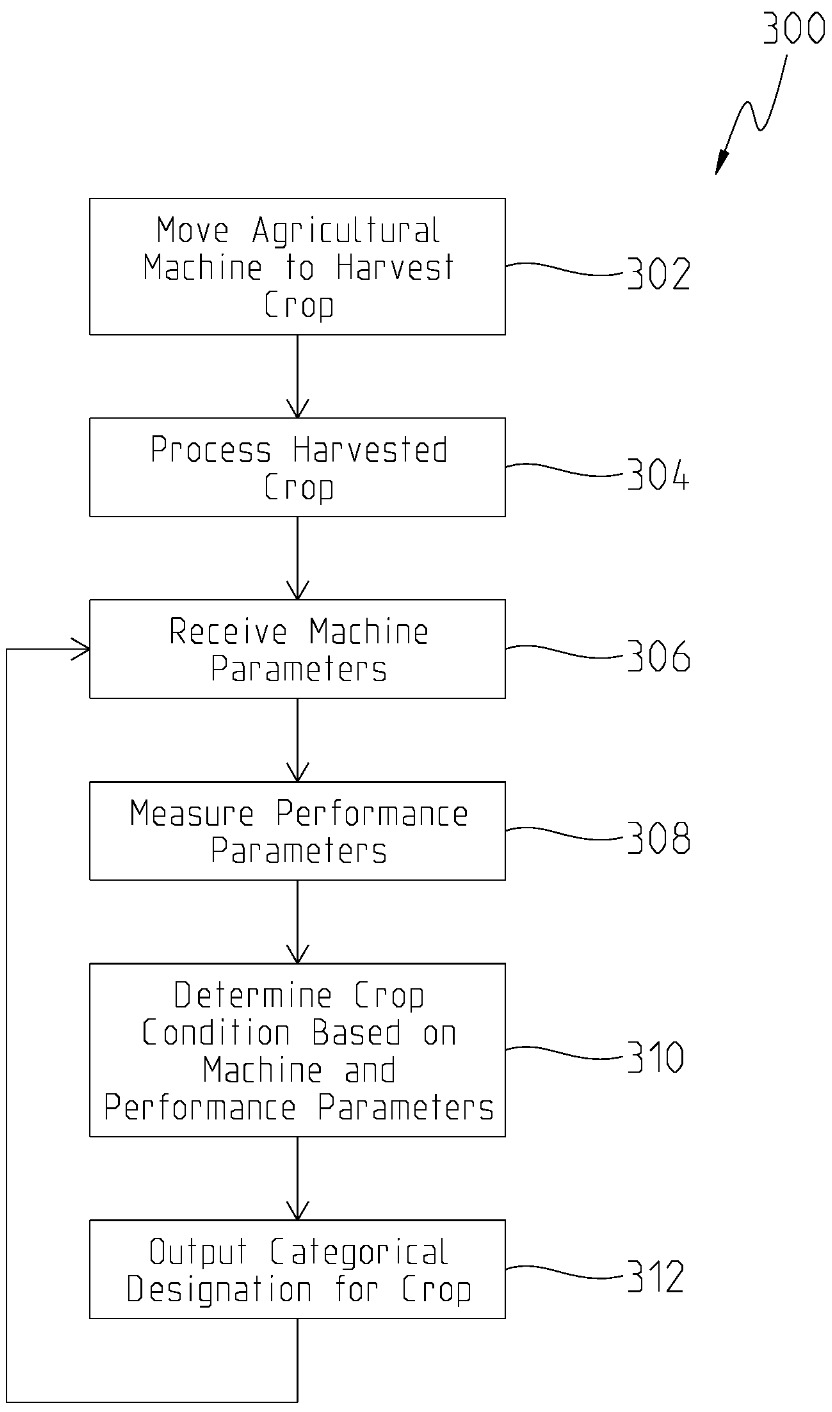
FIG. 7 is a flow diagram of an example method of determining one or more crop conditions of harvested crop.

The control system 200 is usable to determine one or more crop conditions in an example method 300 that is shown in FIG. 7. In the example method 300, at a block 302, the agricultural machine 10 moves through a worksite to harvest crop. At a block 304, harvested crop is processed with at least one of the threshing assembly 26 and the crop debris routing assembly 60. At a block 306, the controller 202 receives one or more machine parameters including at least one of: the feed rate of harvested crop into the agricultural machine 10, the rotational speed of the threshing rotor 36, the position of one or more of the thresher basket 43, the separating grate 45, and the guide vanes 47 (e.g., relative to the threshing rotor 36 or the threshing axis 100), the rotational speed of the chopper rotor 74, and the position of the opposing knives (e.g., relative to the chopper rotor 74 or the chopper axis 92). The one or more machine parameters may be received by the controller 202 in various manners. For example, the one or more machine parameters may be measured by one or more of the sensors described herein and provided to the controller 202 via the one or more sensors. In another example, the one or more machine parameters may be received as one or more set points provided by a user to the user interface, and thereafter, received by the controller 202 via the user interface 204. In another example, the one or more machine parameters may be values stored on the one or more memories 207 and accessed therefrom.

At a block 308, one or more of the sensors or load cells described herein measure one or more performance parameters. For example, the sensor 210 may measure the torque of the threshing rotor 36 or the drive pressure that is indicative thereof. The sensor 216 may measure the torque of the chopper rotor 74 or the drive pressure that is indicative thereof. The load cells 96 may measure the force on the opposing knives 78. The sensor 228 may measure the chop quality of the harvested crop. The controller 202 receives the one or more measured performance parameters from the one or more sensors or load cells. The machine parameters and the performance parameters received by the controller 202 may be numeric values, ranges of values, or categorical designations for the parameters. The values, ranges of values, and categorical designations may be time-referenced.

At a block 310, the controller 202 determines one or more crop conditions based on the one or more machine parameters received by the controller 202 and the one or more measured performance parameters received by the controller 202. In the illustrative implementation, the one or more crop conditions include at least one of a moisture level of the harvested crop and a toughness level of the harvested crop. In some implementations, based on the determined crop condition, the controller 202 is configured to adjust components of the agricultural machine 10 (e.g., actuators 102, 104, 106, the prime mover 108, the drive systems 110, 112, other components of the threshing assembly 26 or the crop debris routing assembly 60, and other components of the agricultural machine 10 separate from the threshing assembly 26 and the crop debris routing assembly 60). In some implementations, based on the determined crop condition, the controller 202 is configured to adjust components of the agricultural machine 10 automatically (e.g., without additional user input). In some implementations, based on the determined crop condition, the controller 202 is configured to adjust components of the agricultural machine 10 in response to receiving user input via the user interface 204. For example, the user input received by the controller 202 may be user input that is based on the determined crop condition, and may be received by the controller 202 subsequent to the determined crop condition being output via the user interface 204.

Referring still to the method 300, in the illustrative implementation, the controller 202 is configured to send a signal to the user interface 204 associated with the determined crop condition. At a block 312, the user interface 204 is configured to output information associated with the determined crop condition. For example, the user interface 204 may output a value, range of values, or a categorical designation associated with the determined crop condition. In some implementations, the categorical designation may indicate that the crop condition is greater than, less than or within a predetermined range for the crop condition. In such examples, the predetermined range for the crop condition is stored on the one or more memories 207. The controller 202 compares the determined crop condition to the predetermined range for the crop condition. The signal sent to the user interface 204 from the controller 202 indicates that the determined crop condition is greater than, less than, or within a predetermined range for the crop condition.

Figure 8:
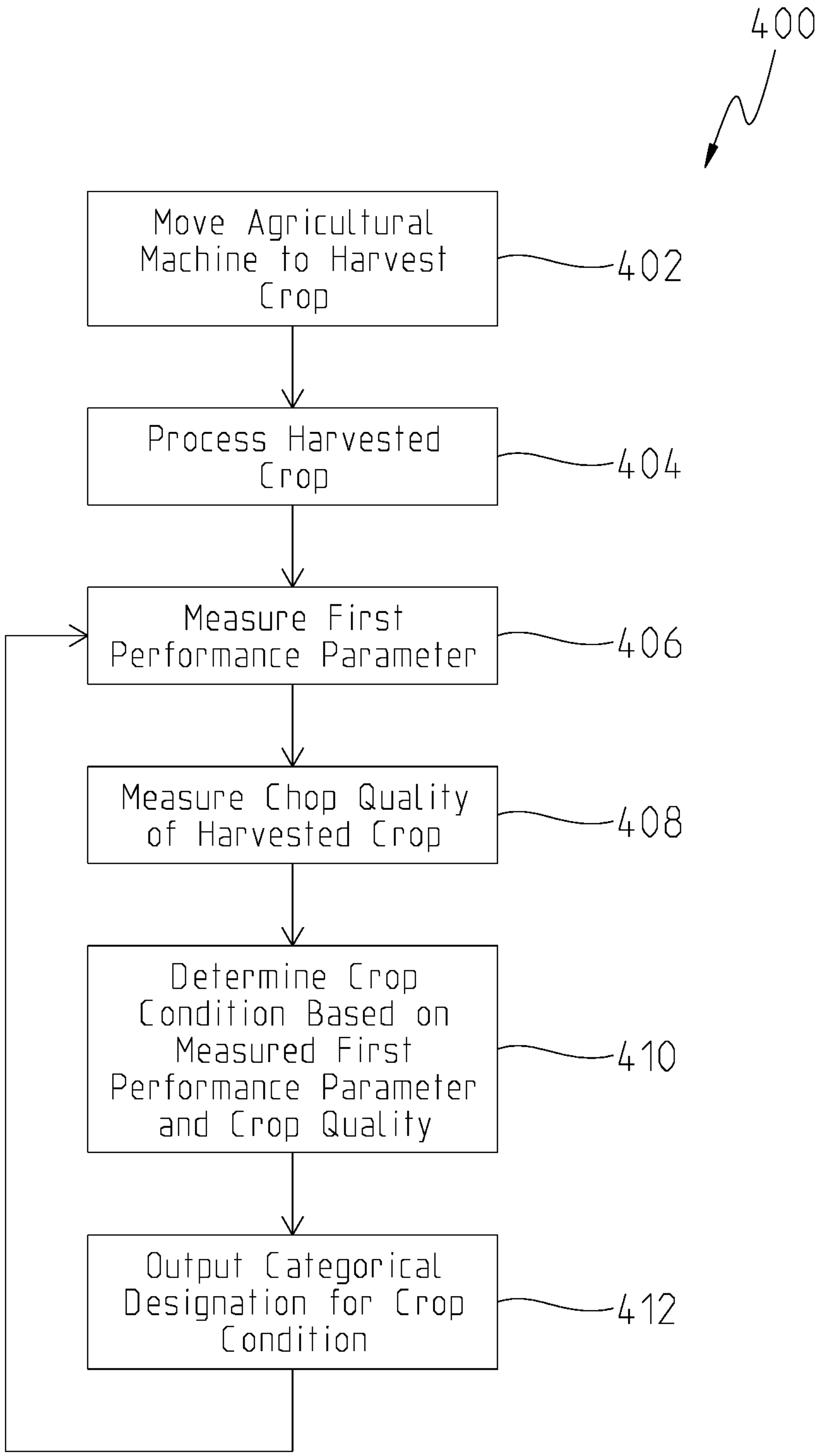
FIG. 8 is a flow diagram of another example method of determining one or more crop conditions of harvested crop.

The control system 200 is usable to determine one or more crop conditions in an example method 400 that is shown at FIG. 8. In the example method 400, at a block 402, the agricultural machine 10 moves through a worksite to harvest crop. At a block 404, harvested crop is processed with at least one of the threshing assembly 26 and the crop debris routing assembly 60. At a block 406, one or more of the sensors or load cells described herein measure a first performance parameter including one of: the torque of the threshing rotor 36 (or an indication thereof), the torque of the chopper rotor 74 (or an indication thereof), and the force on the opposing knives 78. For example, the sensor 210 measures the torque of the threshing rotor 36 (or an indication thereof), the sensor 216 measures the torque of the chopper rotor 74 (or an indication thereof), and the load cells 96 measure the force on the opposing knives 78.

At a block 408, one or more of the sensors or load cells described herein measures a second performance parameter. For example, the sensor 228 measures the chop quality of the harvested crop. The controller 202 receives the measured first performance parameter and the measured chop quality of the harvested crop. At a block 410, the controller 202 determines one or more crop conditions based on the measured first performance parameter and the measured chop quality of the harvested crop. In the illustrative implementation, the one or more crop conditions include at least one of a moisture level of the harvested crop and a toughness level of the harvested crop. In some implementations, based on the determined crop condition, the controller 202 is configured to adjust components of the agricultural machine 10 (e.g., actuators 102, 104, 106, the prime mover 108, the drive systems 110, 112, other components of the threshing assembly 26 and the crop debris routing assembly 60, or other components of the agricultural machine 10 separate from the threshing assembly 26 and the crop debris routing assembly 60).

Referring still to the method 400, the controller 202 is configured to send a signal to the user interface 204 associated with the determined crop condition. At a block 412, the user interface 204 is configured to output information associated with the determined crop condition. For example, the user interface 204 may output a value, range of values, or a categorical designation associated with the determined crop condition. In some implementations, the categorical designation may indicate that the crop condition is greater than, less than, or within a predetermined range for the crop condition. In such examples, the predetermined range for the crop condition is stored on the one or more memories 207. The controller 202 compares the determined crop condition to the predetermined range for the crop condition. The signal sent to the user interface 204 from the controller 202 indicates that the determined crop condition is greater than, less than, or within a predetermined range for the crop condition.

In some implementations, for example with reference to the methods 300 and 400, a crop condition has a known relationship with one or more performance parameters. The known relationship may be stored on the one or more memories 207 and accessed therefrom to determine the crop condition based on the one or more measured performance parameters received by the controller 202. In some implementations, the relationship may change during an agricultural operation based on performance parameters, performance-modifying parameters, or both received by the controller 202 during the agricultural operation.

Figure 9:
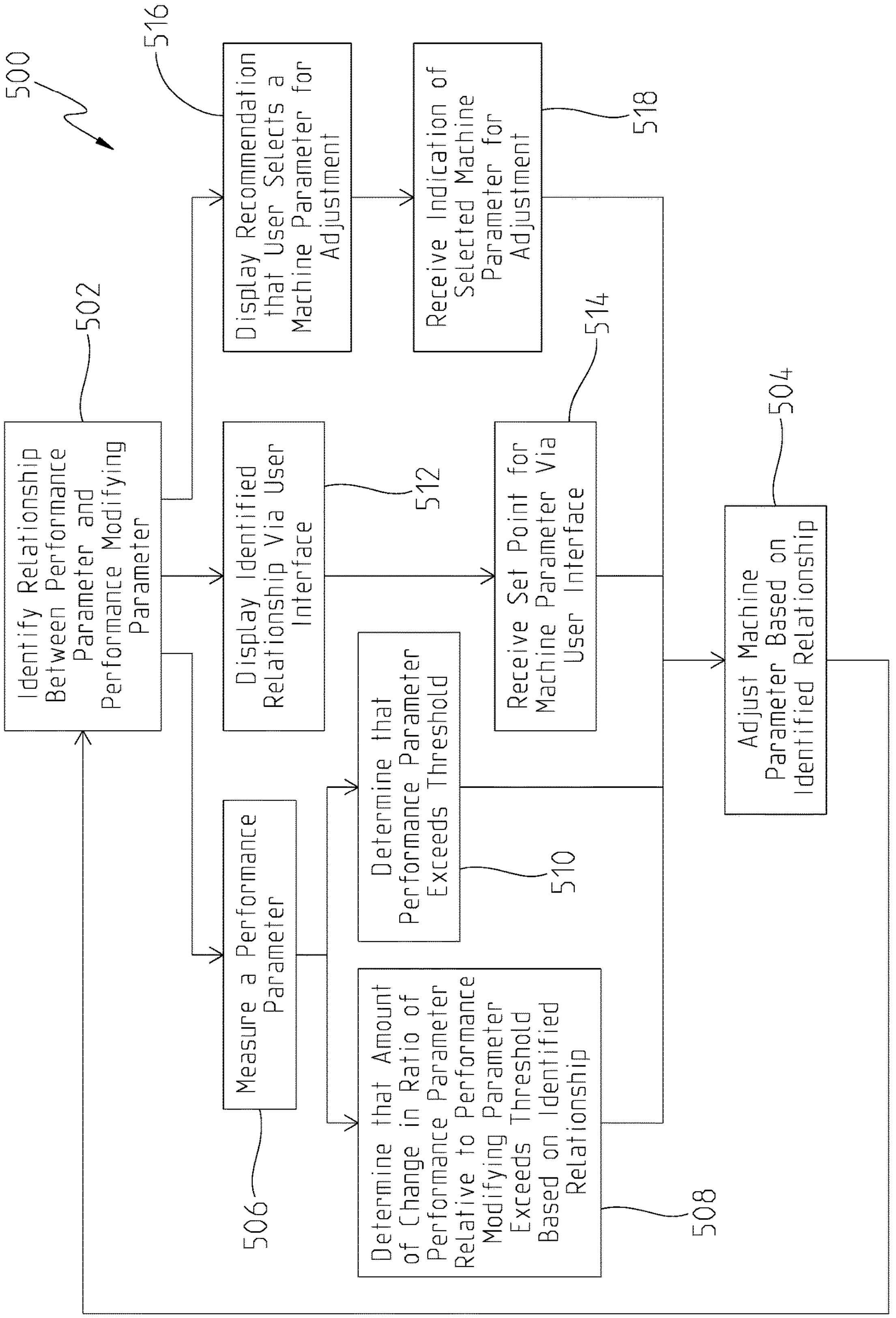
FIG. 9 is a flow diagram of an example method of identifying a relationship between a performance parameter and a performance-modifying parameter and adjusting a machine parameter based on the identified relationship.

In an example method 500 that is shown in FIG. 9, the control system 200 is usable to identify a relationship between: (i) a performance parameter that is associated with the threshing assembly 26 or the crop debris routing assembly 60 and (ii) a performance-modifying parameter. In the example method 500, the control system 200 is also usable to adjust a machine parameter based on the identified relationship. In some implementations, based on the identified relationship, the controller 202 is configured to adjust components of the agricultural machine 10 automatically (e.g., without additional user input). In some implementations, based on the identified relationship, the controller 202 is configured to adjust components of the agricultural machine 10 in response to receiving user input via the user interface 204. For example, the user input received by the controller 202 may be user input that is based on the identified relationship, and may be received by the controller 202 subsequent to the identified relationship being output via the user interface 204.

At a block 502, the controller 202 identifies a relationship between the performance parameter and the performance-modifying parameter. In the illustrative implementation, the performance-modifying parameter includes a machine parameter, a crop condition, or the chop quality of harvested crop. In the illustrative implementation, the machine parameter includes: the feed rate of harvested crop into the agricultural machine 10, the rotational speed of the threshing rotor, the position of one or more of the thresher basket 43, the separating grate 45, and the guide vanes 47 (e.g., relative to the threshing rotor 36 or the threshing axis 100), the rotational speed of the chopper rotor 74, or the position of the opposing knives (e.g., relative to the chopper rotor 74 or the chopper axis 92). In the illustrative implementation, the crop condition is the moisture level of the harvested crop or the toughness level of the harvested crop. In the illustrative implementation, the performance parameter is associated with the threshing assembly 26 (e.g., a torque or power of the threshing rotor 36) or the crop debris routing assembly 60 (e.g., a torque or power of the chopper rotor 74 or a force on the opposing knives 78).

At a block 504, the controller 202 adjusts at least one machine parameter to change an amount of power required by at least one of the threshing assembly 26 and the crop debris routing assembly 60. For example, the controller 202 sends a signal to at least one of the actuators 102, 104, 106, the prime mover 108, and the drive systems 110, 112 causing adjustment thereof that results in a change in the power required by at least one of the threshing assembly 26 and the crop debris routing assembly 60.

At a block 506, a performance parameter is measured, for example, by one of the sensors or the load cells described herein. The measured performance parameter is received by the controller 202. The measured performance parameter received by the controller 202 may be a numeric value or a range of values for the performance parameter, and the value or range of values may be time referenced. The measurement described at block 506 may be performed repeatedly and, each time, the measurement may be provided to the controller 202. In an illustrative implementation, at a block 508, the controller 202 determines, based on the identified relationship between the performance parameter and the performance-modifying parameter that an amount of change in the ratio of the measured performance parameter relative to the performance-modifying parameter exceeds a threshold amount of change in the ratio of the measured performance parameter relative to the performance-modifying parameter. In such an implementation, the threshold amount of change in the ratio of the measured performance parameter relative to the performance-modifying parameter is stored in the one or more memories 207. In such an implementation, amount of change in the ratio may be embodied as the slope of a line formed when values of measured performance parameters are plotted relative to corresponding values of performance-modifying parameters.

In another illustrative implementation, at a block 510, the controller 202 determines that the measured performance parameter exceeds a threshold value for the performance parameter. In such an implementation, the threshold value for the performance parameter is stored in the one or more memories 207.

In some implementations, at the block 504, the controller 202 adjusts at least one machine parameter to change an amount of power required by at least one of the threshing assembly 26 and the crop debris routing assembly 60 in response to the determination made at the block 508 or the block 510.

In the illustrative implementation, at a block 512, the user interface 204 displays the identified relationship between (i) the performance parameter that is associated with the threshing assembly 26 or the crop debris routing assembly 60 and (ii) the performance-modifying parameter. The identified relationship may be displayed, for example, as a graphical representation including a curve, line, or surface associated with values for the performance-modifying parameter at corresponding values for the performance parameter. In some implementations, the performance-modifying parameter is represented at a horizontal axis, and the performance parameter is represented a vertical axis. In some implementations, the performance-modifying parameter associated with the identified relationship is a machine parameter. The user interface 204 may provide information prompting a user to select whether to initiate an adjustment to the agricultural machine 10 using the displayed relationship. In some implementations, the user interface 204 receives input from a user indicative of a set point for the machine parameter associated with the identified relationship. For example, the user may select a point on the curve, line, or surface via the user interface 204. At a block 514, the controller 202 receives the set point for the machine parameter. In such implementations, at the block 504, the controller 202 adjusts at least one machine parameter to change an amount of power required by at least one of the threshing assembly 26 and the crop debris routing assembly 60 in response to receiving the set point for the machine parameter at the block 514.

In some implementations, at block 516, the user interface 204 displays a recommendation that a user select at least one machine parameter for adjustment. In some implementations, the user interface 204 may receive input from a user indicating a selection of at least one machine parameter for adjustment. At a block 518, the controller 202 receives an indication from the user interface 204 of the selection of at least one machine parameter for adjustment. In such implementations, at the block 504, the controller 202 adjusts at least one machine parameter to change an amount of power required by at least one of the threshing assembly 26 and the crop debris routing assembly 60 in response to receiving the indication at the block 518.

Figure 10:
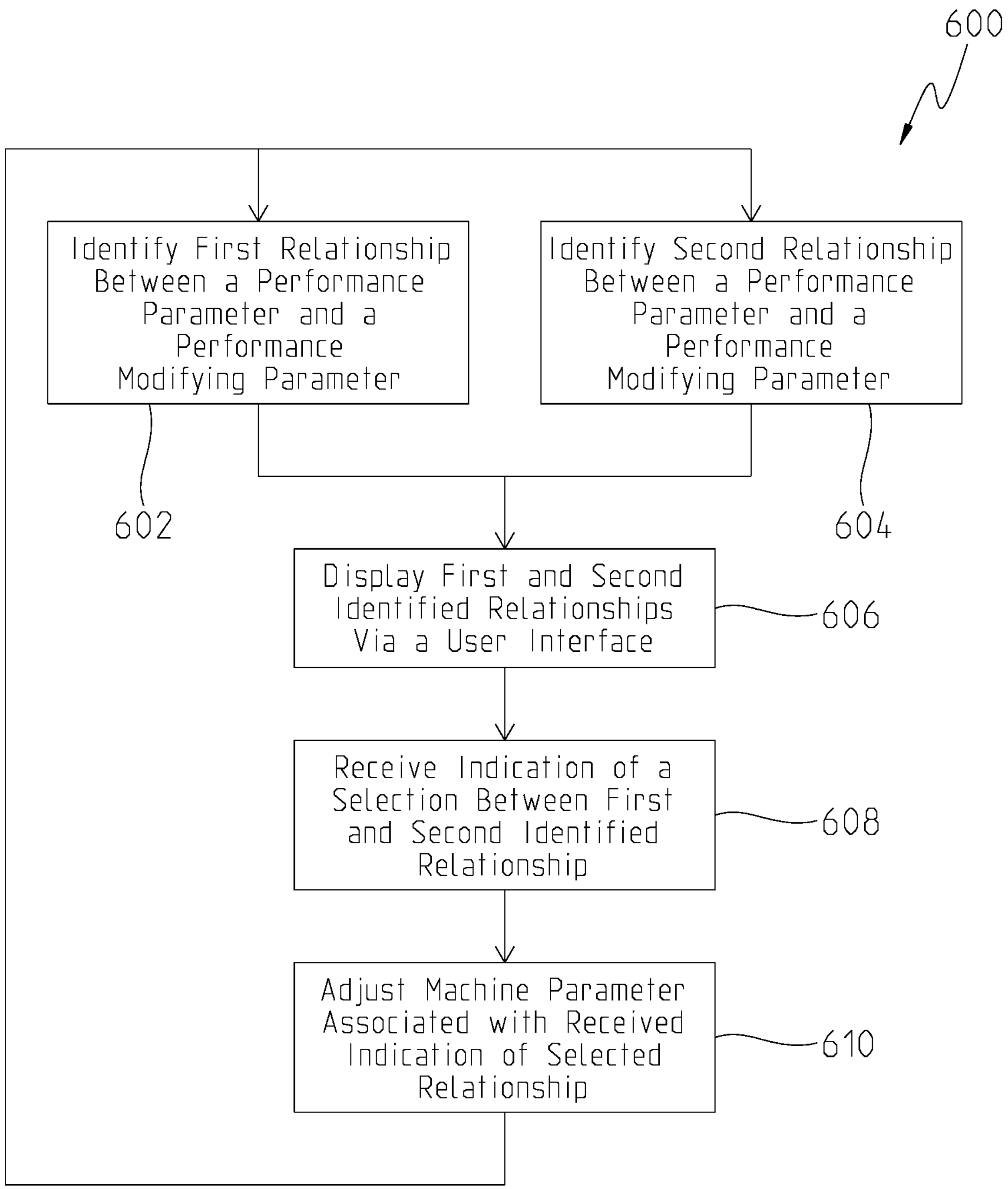
FIG. 10 is a flow diagram of an example method of identifying two relationships between performance parameters and performance-modifying parameters and adjusting a machine parameter based on at least one of the two relationships.

In an example method 600 that is shown in FIG. 10, the control system 200 is usable to identify two relationships between performance parameters and performance-modifying parameters and adjust a machine parameter based on at least one of the two identified relationships. At a block 602, the controller 202 identifies a first relationship between (i) a performance parameter that is associated with the threshing assembly 26 or the crop debris routing assembly 60 and (ii) a performance-modifying parameter. At a block 604, the controller 202 identifies a second relationship between (i) a performance parameter that is associated with the threshing assembly 26 or the crop debris routing assembly 60 and (ii) a performance-modifying parameter. In the illustrative implementation, at least one of the performance parameter and the performance-modifying parameter associated with the second relationship is different from the performance parameter or the performance-modifying parameter associated with the first relationship.

In the illustrative implementation, the performance-modifying parameters associated with the first and second relationships are, each, one of a machine parameter, a crop condition, and a chop quality of harvested crop. The machine parameters include: the feed rate of harvested crop into the agricultural machine 10, the rotational speed of the threshing rotor, the position of one or more of the thresher basket 43, the separating grate 45, and the guide vanes 47 (e.g., relative to the threshing rotor 36 or the threshing axis 100), the rotational speed of the chopper rotor 74, or the position of the opposing knives 78 (e.g., relative to the chopper rotor 74 or the chopper axis 92). The crop condition includes the moisture level of the harvested crop or the toughness level of the harvested crop. The performance parameter is associated with the threshing assembly 26 (e.g., a torque of the threshing rotor 36) or the crop debris routing assembly 60 (e.g., a torque of the chopper rotor 74 or a force on the opposing knives 78).

In the illustrative implementation, at a block 606, the user interface 204 displays the identified relationships. The identified relationships may be displayed, for example, as graphical representations including curves, lines, and surfaces, for example, associated with values for the performance-modifying parameters at corresponding values for the performance parameters. In some implementations, the performance-modifying parameters are represented at horizontal axes, and the performance parameters are represented vertical axes. In some implementations, the performance-modifying parameters associated with the identified relationships are machine parameters.

The user interface 204 may provide information prompting the user to select whether to initiate an adjustment of a machine parameter associated with the first identified relationship or the second identified relationship. In some implementations, the user interface 204 receives input from a user indicative of a selection between the first identified relationship and the second identified relationship. At a block 608, the controller 202 receives an indication of the selection between the first identified relationship and the second identified relationship. At the block 610, the controller 202 adjusts the machine parameter associated with the received indication to change an amount of power required by at least one of the threshing assembly 26 and the crop debris routing assembly 60.

Figure 11:
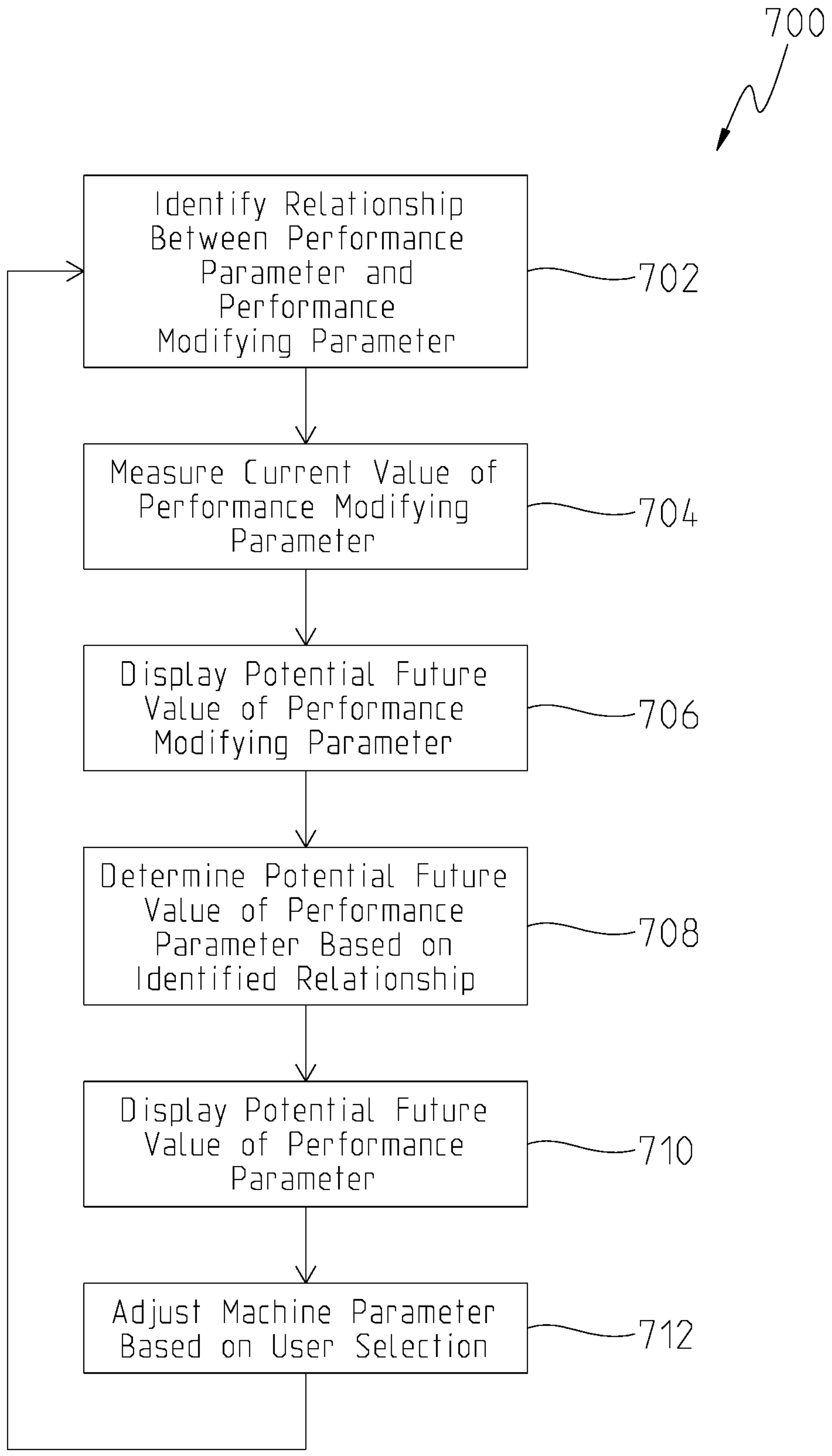
FIG. 11 is a flow diagram of an example method of identifying a relationship between a performance parameter and a performance-modifying parameter and displaying a potential future value for the performance-modifying parameter or the performance parameter based on the identified relationship.

In an example method 700 that is shown in FIG. 11, the control system 200 is usable to identify a relationship between a performance parameter and a performance-modifying parameter and usable to display potential future values for the performance-modifying parameters and the performance parameters based on the identified relationship. At a block 702, the controller 202 identifies a relationship between the performance parameter and the performance-modifying parameter. In the illustrative implementation, the performance-modifying parameter is one of a machine parameter, a crop condition, and the chop quality of harvested crop. The machine parameter includes: the feed rate of harvested crop into the agricultural machine 10, the rotational speed of the threshing rotor, the position of one or more of the thresher basket 43, the separating grate 45, and the guide vanes 47 (e.g., relative to the threshing rotor 36 or the threshing axis 100), the rotational speed of the chopper rotor 74, or the position of the opposing knives (e.g., relative to the chopper rotor 74 or the chopper axis 92). The crop condition includes the moisture level of the harvested crop or the toughness level of the harvested crop. The performance parameter is associated with the threshing assembly 26 (e.g., the torque of the threshing rotor 36) or the crop debris routing assembly 60 (e.g., the torque of the chopper rotor 74 or the force on the opposing knives 78).

At a block 704, a performance-modifying parameter is measured, for example, by one of the sensors described herein. In the illustrative implementation, a measured performance-modifying parameter is referred to as a current value of the performance-modifying parameter. The measured values for the performance-modifying parameters may be numeric values or ranges of values, and the values and ranges of values may be time-referenced. At a block 706, the user interface 204 displays a potential future value for the performance-modifying parameter that is associated with a different power requirement for at least one of the threshing assembly 26 and the crop debris routing assembly 60 than that of the current value for the performance-modifying parameter. At a block 708, the controller 202 determines a potential future value for the performance parameter based on the potential future value for the performance-modifying parameter and the identified relationship between the performance parameter and the performance-modifying parameter. At a block 710, the user interface 204 displays the potential future value for the performance parameter. The user interface 204 may provide information prompting the user to select whether to initiate an adjustment to a machine parameter based on the potential future value for the performance parameter. At a block 712, the controller 202 adjusts at least one machine parameter to change an amount of power required by at least one of the threshing assembly 26 and the crop debris routing assembly 60, for example, in response to receiving an indication of a user selection to initiate an adjustment to a machine parameter via the user interface 204.

To improve accuracy when identifying a relationship between the performance parameter and the performance-modifying parameter, it may be advantageous to provide additional information to the one or more memories 207 during an agricultural operation. For example, any one of the methods 500, 600, 700 may further include the blocks 802, 804, 806, 808, 810, 812 of the method 800, which is shown at FIG. 12.

Figure 12:
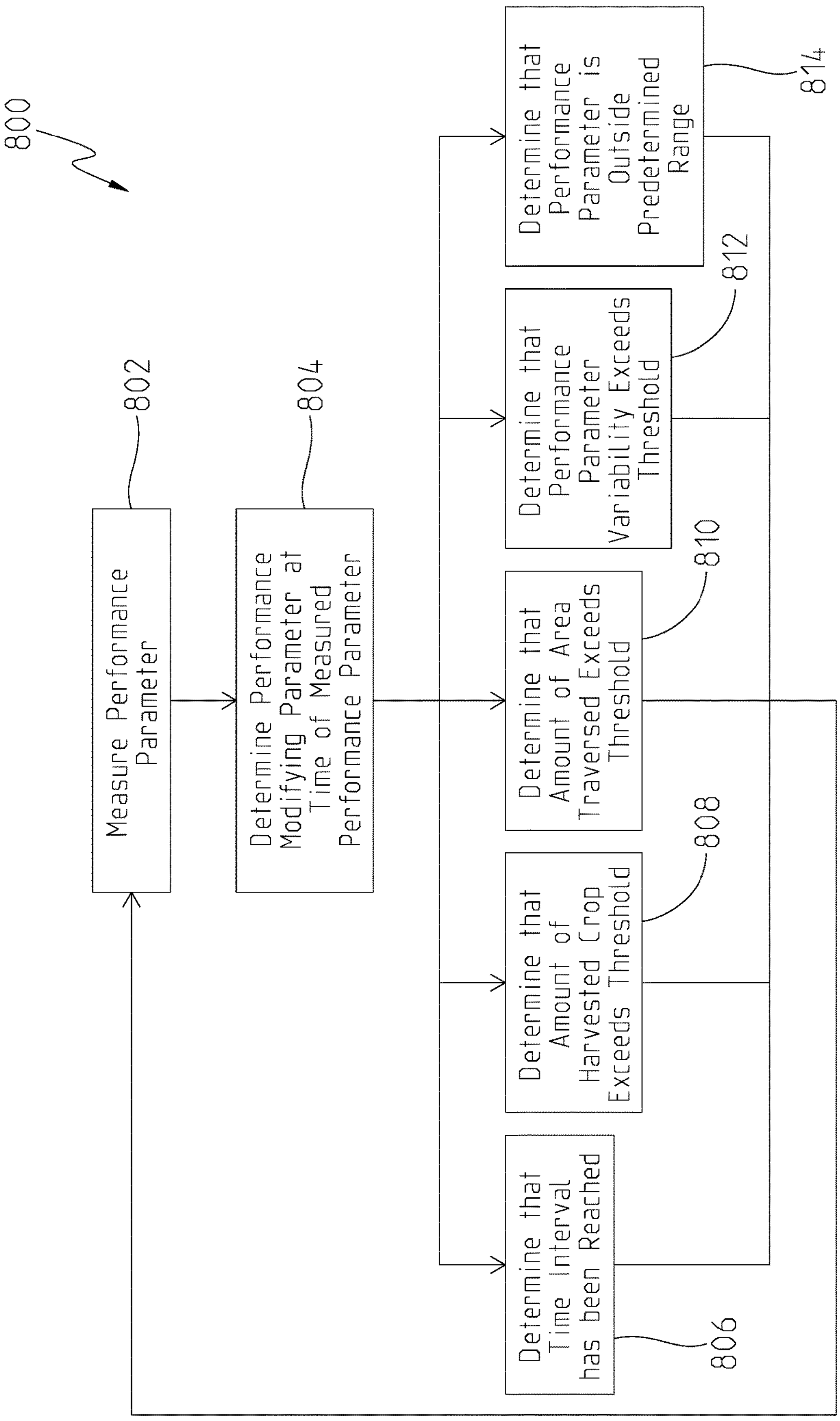
FIG. 12 is a flow diagram of an example method of updating relationships between performance parameters and performance-modifying parameters during an agricultural operation.

In the example method 800 that is shown in FIG. 12, the control system 200 is usable to update relationships between performance parameters and performance-modifying parameters during an agricultural operation. At the block 802, one or more of the sensors or load cells described herein measures a value of a performance parameter. In some implementations, the sensors described herein also measure a value of a performance-modifying parameter. The measured value of the performance parameter and a corresponding value for a performance-modifying parameter is stored on the one or more memories 207. The measured and corresponding values for the parameters may be numeric values, ranges of values, or categorical designations for the parameter. The values, ranges of values, and categorical designations may be time-referenced. In such an implementation, the corresponding value of the performance-modifying parameter is a value of a performance-modifying parameter at the time reference associated with the measured performance parameter. Thus, at a block 804, the controller 202 may determine the corresponding value for the performance-modifying parameter based on the time-reference for the measured performance parameter.

In some implementations, the controller 202 stores a measured value of a performance parameter and a corresponding value for a performance-modifying parameter at constant time intervals. Thus, at block 806, the controller 202 determines that a time interval (e.g., stored in the one or more memories 207) has been reached, and the controller 202 stores a measured value of the performance parameter and a corresponding value for the performance-modifying parameter in response to determining that the time interval has been reached.

In some implementations, there is stored on the one or more memories 207 a maximum value (e.g., a threshold) for an amount of harvested crop or an amount of area traversed by the agricultural machine 10. In such implementations, the controller 202 may receive an indication associated with an amount of harvested crop or an amount of area traversed (e.g., based on measurement by one or more the sensors described herein). In the illustrative implementation, at block 808, based on a received indication associated with an amount of harvested crop, the controller 202 determines that the amount of harvested crop exceeds the threshold amount of harvested crop. In some implementations, at block 810, based on a received indication associated with an amount of area traversed, the controller 202 determines that the amount of area traversed exceeds the threshold amount of area traversed. In such implementations, the controller 202 stores a measured value of a performance parameter and a corresponding value for a performance-modifying parameter in response determining, via the controller 202, that a threshold amount of harvested crop or threshold area traversed has been exceeded.

In other implementations, there is stored on the one or more memories 207 maximum values (e.g., a thresholds) for amounts of variability of the measured performance parameters. In such implementations, the controller 202 compares the values of multiple performance parameter measurements to determine the variability of the performance parameter measurements. At a block 812, the controller 202 determines that the variability of the performance parameter measurements exceeds the threshold amount of variability of the performance parameter. In such implementations, the controller 202 stores a measured value of a performance parameter and a corresponding value for a performance-modifying parameter, in response to determining, via the controller 202, that a threshold amount of variability of the performance parameter has been exceeded.

In other implementations, there is stored on the one or more memories 207 a predetermined range (e.g., thresholds) for a performance parameter based on an identified relationship between the performance parameter and a performance modifying parameter. In such implementations, the controller 202 compares a measured value for the performance parameter to the predetermined range for the performance parameter. At a block 814, the controller 202 determines that the measured value for the performance parameter is outside the predetermined range for the performance parameter. In such implementations, the controller 202 stores a measured value of a performance parameter and a corresponding value for a performance-modifying parameter in response to determining, via the controller 202, that the measured value for the performance parameter is outside the predetermined range for the performance parameter.

It should be appreciated that, regardless of how the methods 500, 600, 700, 800 are described above, the methods are applicable to relationships between a performance parameter and one performance-modifying parameter and relationships between a performance parameter and more than one performance-modifying parameter.

Figure 13A:
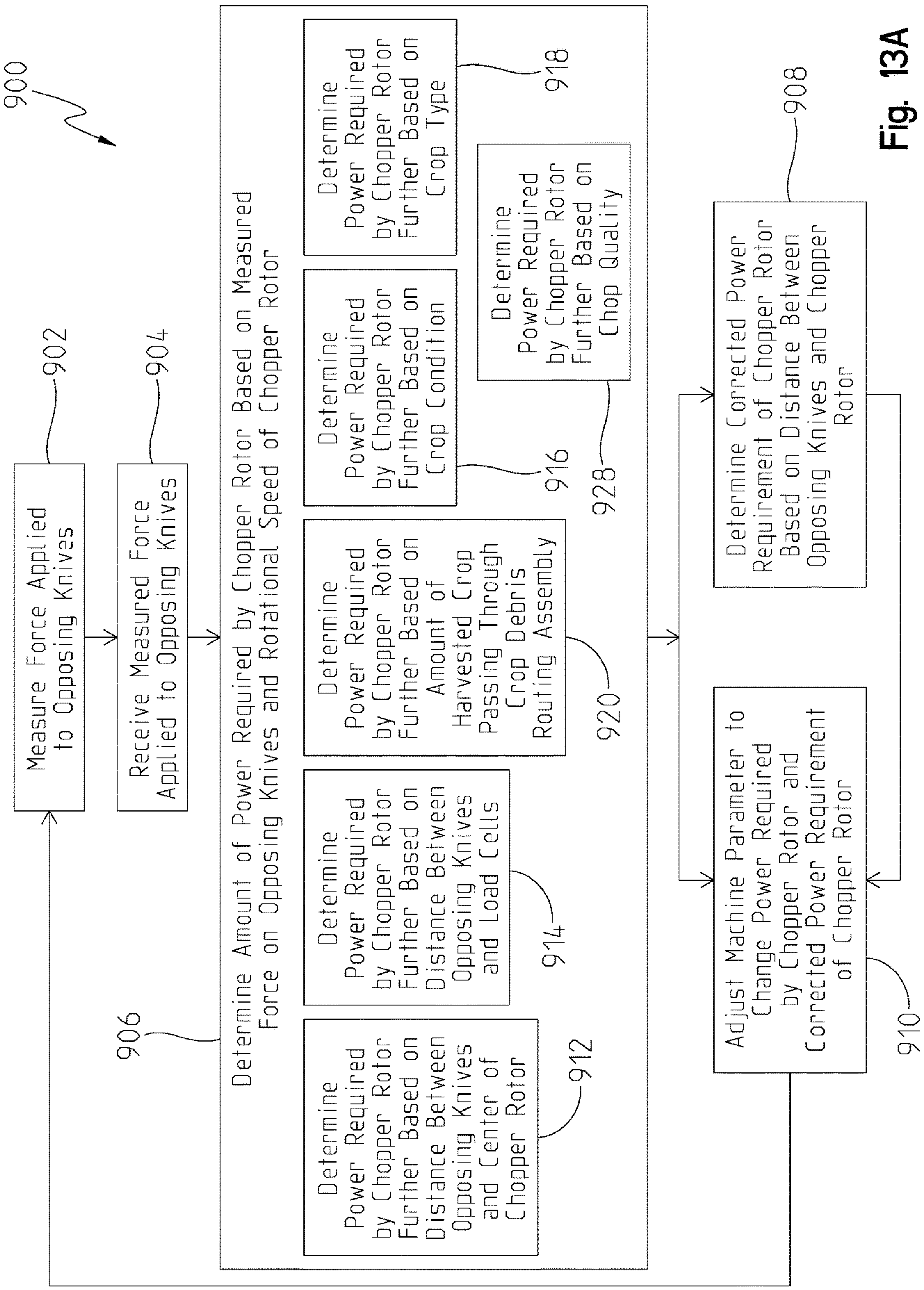
FIG. 13A is a flow diagram of an example method of indirectly determining an amount of power required by a chopper rotor of a crop debris routing assembly, such as the crop debris routing assembly of FIGS. 1-5, and adjusting a machine parameter to change the power required by the chopper rotor.

In an example method 900 that is shown in FIG. 13A, the control system 200 is usable to indirectly determine an amount of power required by the chopper rotor 74. At a block 902, the load cells 96 measure a force applied to the opposing knives 78 as harvested crop passes through the crop debris routing assembly 60. At a block 904, the controller 202 receives the measured force applied to the opposing knives 78. In some implementations, the controller 202 also receives the rotational speed of the chopper rotor 74. For example, the rotational speed of the chopper rotor 74 may be received from the sensor 222, received as a set point via the user interface 204, or otherwise received on the one or more memories 207. At a block 906, the controller 202 determines an amount of power required by the chopper rotor 74 based on the measured force applied to the opposing knives 78 and the rotational speed of the chopper rotor 74.

In some implementations, the block 906 further includes a block 912, at which the controller 202 determines the amount of power required by the chopper rotor 74 further based on a distance between the portion of the opposing knives 78 (e.g., at location 118) and a center point of the chopper rotor 74 through which the chopper axis 92 extends. In some implementations, the sensor 224 measures the distance between the portion of the opposing knives 78 and the center point of the chopper rotor 74 and provides the measured distance to the controller 202.

In some implementations, the block 906 further includes a block 914, at which the controller 202 determines the amount of power required by the chopper rotor 74 further based on a distance between a portion of the opposing knives 78 (e.g., at location 118) and the load cells 96. In some implementations, the sensor 218 measures the distance between the portion of the opposing knives 78 and load cells 96 and provides the measured distance to the controller 202.

In some implementations, the block 906 further includes a block 916, at which the controller 202 determines the amount of power required by the chopper rotor 74 further based on a crop condition of the harvested crop, such as a moisture level of the harvested crop or a toughness level of the harvested crop. In some implementations, the block 906 further includes a block 918, at which the controller 202 determines the amount of power required by the chopper rotor 74 further based on a crop type of the harvested crop, such as corn, soybean, or wheat. In some implementations, the block 906 further includes a block 928, at which the controller 202 determines the amount of power required by the chopper rotor 74 further based on a chop quality of the harvested crop that exits the crop debris routing assembly 60.

Referring still to the method 900, in some implementations, the block 906 further includes a block 920. At the block 920, the controller 202 determines the amount of power required by the chopper rotor 74 further based on an amount of harvested crop passing through the crop debris routing assembly 60.

Figure 13B:
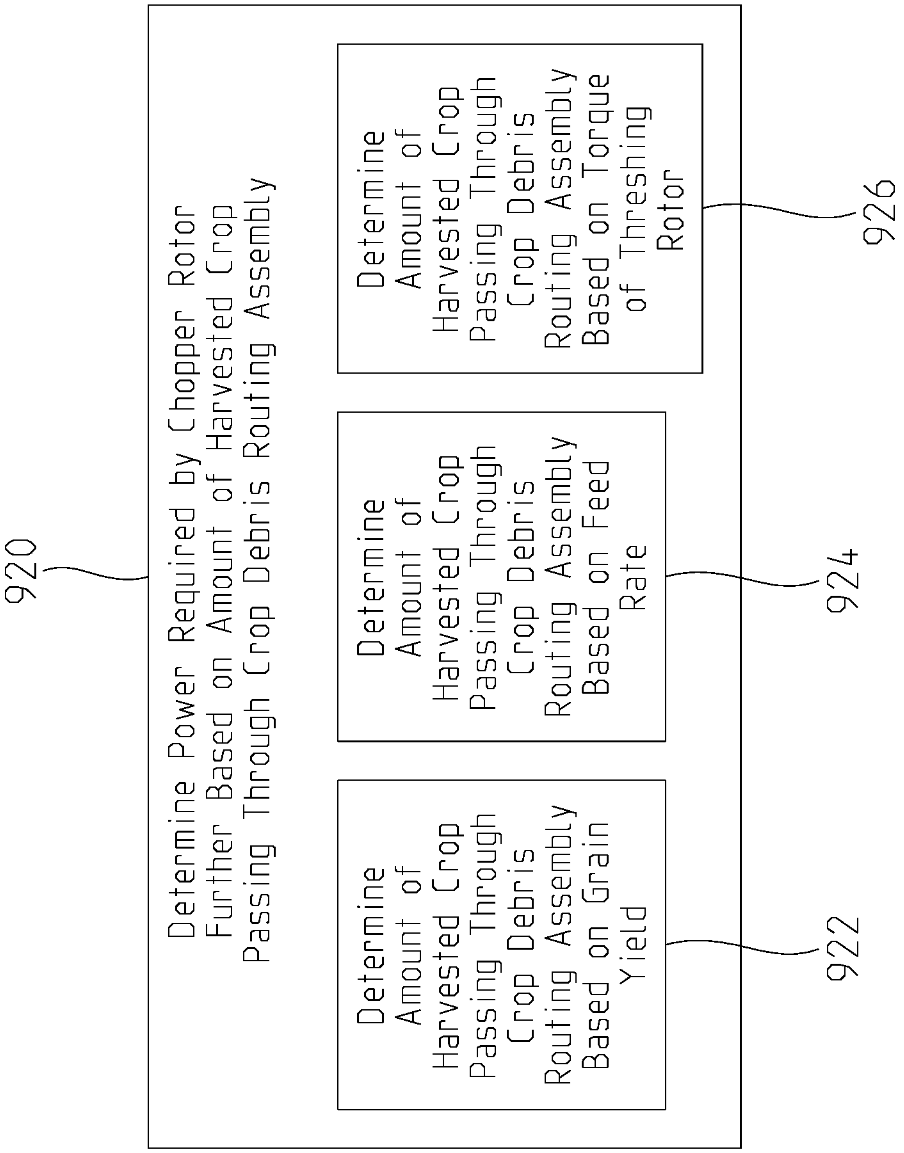
FIG. 13B is a flow diagram of an example method of indirectly determining the amount of power required by a chopper rotor of a crop debris routing assembly, such as the crop debris routing assembly of FIGS. 1-5, based on an amount of harvested crop passing through the crop debris routing assembly.

In some implementations, the sensor 214 measures a grain yield of the harvested crop and provides the measured grain yield to the controller 202. As shown in FIG. 13B, the block 920 further includes a block 922 at which the controller 202 determines the amount of harvested crop passing through the crop debris routing assembly 60 based on the measured grain yield.

In some implementations, the sensor 226 measures a feed rate of the harvested crop into the agricultural machine 10 and provides the feed rate to the controller 202. In other implementations, the controller 202 determines the feed rate based on the speed of the agricultural machine 10 and the height of the cutting head 18 above the underlying ground surface during a harvesting operation. In such implementations, the controller 202 may also use the lateral length of the cutting head 18 to determine the feed rate. In such implementations, the controller 202 may also use the measured biomass yield to determine the feed rate. As shown in FIG. 13B, the block 920 further includes a block 924 at which the controller 202 determines the amount of harvested crop passing through the crop debris routing assembly 60 based on the measured or determined feed rate.

In some implementations, the torque (or indication thereof) of a component of the agricultural machine 10 other than the chopper rotor 74 may be measured by a sensor of the agricultural machine 10 and provided to the controller 202. For example, the sensor 210 measures a torque of the threshing rotor 36 (or indication thereof) and provides the measured torque (or indication thereof) to the controller 202. In the some implementations, the controller 202 may determine the power required by the threshing rotor 36 based on the measured torque. As shown in FIG. 13B, the block 920 further includes a block 926 at which the controller 202 determines the amount of harvested crop passing through the crop debris routing assembly 60 based on the measured torque of the threshing rotor 36 (or an indication thereof) or based on the determined power required by the threshing rotor 36.

Referring again to FIG. 13A, in some implementations, at a block 908, the controller 202 determines a corrected power requirement of the chopper rotor 74 based on the determined amount of power required by the chopper rotor 74 (e.g., which is determined at block 906) and a position of the opposing knives 78 relative to the chopper rotor 74. In the illustrative implementation, the sensor 224 measures the position of the opposing knives 78 relative to the chopper rotor 74 and provides the measured position to the controller 202. The position of the opposing knives 78 relative to the chopper rotor 74 may be defined based on the distance between the portion of the opposing knives 78 (e.g., at location 118) and a center of the chopper rotor 74.

Referring still to FIG. 13A, in some implementations, at a block 910, the controller 202 adjusts at least one machine parameter to change an amount of power required by the crop debris routing assembly 60. For example, the controller 202 sends a signal to at least one of the actuators 104, 106, the prime mover 108, and the drive system 112 causing adjustment of thereof that results in a change to the power required by the chopper rotor 74. Such adjustment also results in a change to the corrected power requirement of the chopper rotor 74.

In some implementations, the block 910 includes adjusting at least one machine parameter to change an amount of power required by the crop debris routing assembly 60 in response to determining, via the controller 202, that the power required by the crop debris routing assembly 60 is greater than a predetermined amount of power required by the crop debris routing assembly 60. In such implementations, the predetermined amount of power required by the crop debris routing assembly 60 is stored on the one or more memories 207 and accessed therefrom.

Figure 14:
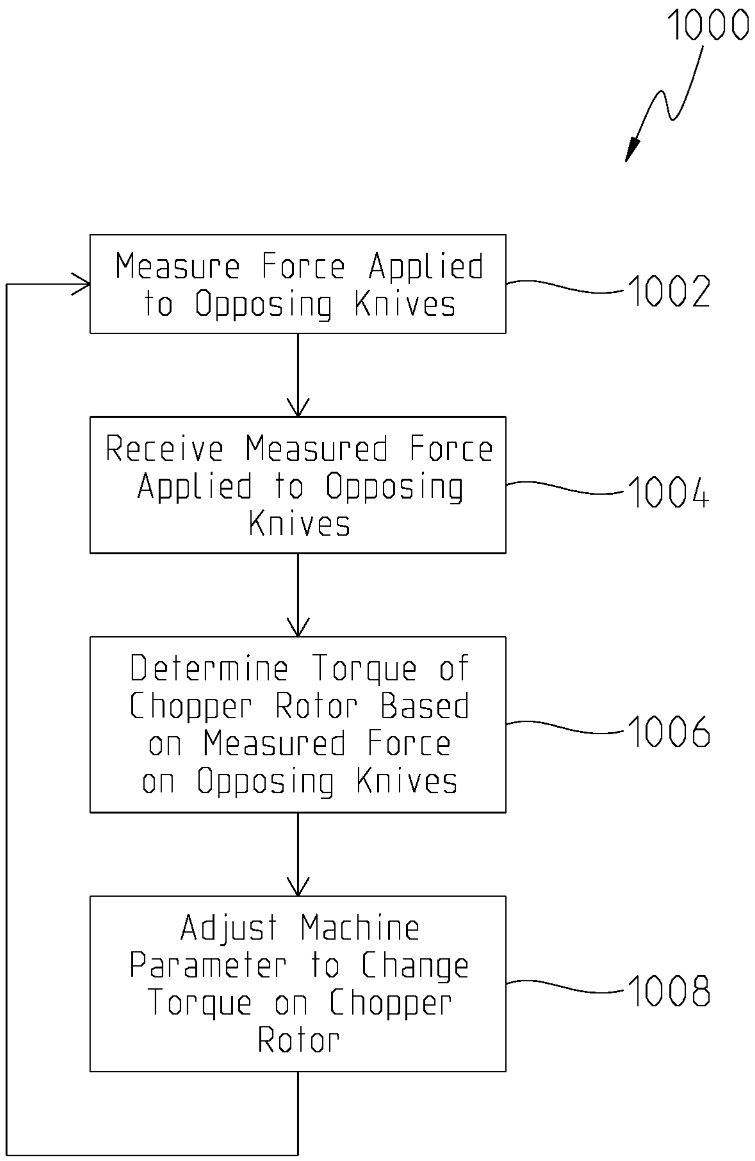
FIG. 14 is a flow diagram of an example method of indirectly determining a torque of a chopper rotor of a crop debris routing assembly, such as the crop debris routing assembly of FIGS. 1-5, and adjusting a machine parameter to change the torque of the chopper rotor.

In an example method 1000 that is shown in FIG. 14, the control system 200 is usable to indirectly determine the torque of the chopper rotor 74. The method 1000 for indirect determination of torque of the chopper rotor 74 is similar to the method 900 for indirect determination of power of the chopper rotor 74, except that the rotational speed of the chopper rotor 74 is not used by the controller 202 to determine torque of the chopper rotor 74. Thus, at a block 1002, the load cells 96 measure a force applied to the opposing knives 78 as harvested crop passes through the crop debris routing assembly 60. At a block 1004, the controller 202 receives the measured force applied to the opposing knives 78. At a block 1006, the controller 202 determines the torque of the chopper rotor 74 based on the measured force applied to the opposing knives 78 and the distance between the portion of the opposing knives 78 (e.g., at location 118) and the center point of the chopper rotor 74. In some implementations, the controller 202 may determine the torque of the chopper rotor 74 further based on one or more of the distance between the portion of the opposing knives 78 (e.g., at location 118) and the load cells 96, a crop condition of the harvested crop (e.g., the moisture level or the toughness level of the harvested crop), a crop type of the harvested crop, (e.g., corn, soybeans, or wheat), the chop quality of harvested crop that exits the crop debris routing assembly 60, and the amount of harvested crop passing through the crop debris routing assembly 60. In some implementations, the controller 202 determines a corrected torque of the chopper rotor 74 based on the determined torque of the chopper rotor 74 and a position of the opposing knives 78 relative to the chopper rotor 74. At a block 1008, the controller 202 adjusts at least one machine parameter to change the torque of the chopper rotor 74. In some implementations, the controller 202 adjusts at least one machine parameter in response to determining that the determined or corrected torque of the chopper rotor 74 is greater than a predetermined torque of the chopper rotor 74.

In some implementations, the methods described herein may further include rotating at least one of the threshing rotor 36 and the chopper rotor 74 about the axes, 100 or 92, respectively, to process harvested crop. In some implementations, the methods described herein may further include moving the opposing knives 78 relative to the chopper rotor 74, the chopper axis 92, or the chopper housing 72. In some implementations, the methods described herein may further include moving one or more of the thresher basket 43, the separating grate 45, or the guide vanes 47 relative to the threshing rotor 36 or threshing axis 100. In some implementations, the methods described herein may further include processing the harvested crop with at least one of the threshing assembly 26 and the crop debris routing assembly 60. The disclosure herein is not limited to the agricultural machine 10 and is applicable to any agricultural machine suitable for processing harvested crop.

While the disclosure has been illustrated and described in detail in the drawings and foregoing description, such illustration and description is to be considered as exemplary and not restrictive in character, it being understood that illustrative implementation(s) have been shown and described and that all changes and modifications that come within the spirit of the disclosure are desired to be protected. It will be noted that alternative implementations of the present disclosure may not include all of the features described yet still benefit from at least some of the advantages of such features. Those of ordinary skill in the art may readily devise their own implementations that incorporate one or more of the features of the present disclosure and fall within the spirit and scope of the present disclosure as defined by the appended claims.

The invention claimed is:

1. A method of determining one or more crop conditions of harvested crop processed by an agricultural machine, the method comprising:

moving the agricultural machine through a worksite to harvest crop;

processing the harvested crop with at least one of: a threshing rotor in cooperation with at least one of a thresher basket and guide vanes, and a chopper rotor in cooperation with opposing knives;

measuring one or more performance parameters associated with operation of the agricultural machine and providing the one or more measured performance parameters to a controller;

receiving, via the controller, the one or more measured performance parameters and one or more machine parameters that affect the one or more measured performance parameters of the agricultural machine;

determining, via the controller, one or more crop conditions based on the one or more measured performance parameters and the one or more machine parameters received by the controller;

determining, for each of a plurality of times, a ratio of a measured performance parameter of the one or more measured performance parameters to a corresponding machine parameter of the one or more machine parameters; and adjusting, in response to determining that an amount of change in the ratio over time exceeds a stored threshold amount of change, at least one of the one or more machine parameters based on an identified relationship between the measured performance parameter and the corresponding machine parameter.

2. The method of claim 1, wherein the one or more crop conditions includes a moisture level of the harvested crop.

3. The method of claim 1, wherein the one or more crop conditions includes a toughness level of the harvested crop.

4. The method of claim 1, wherein the one or more machine parameters received by the controller includes or is indicative of a feed rate of harvested crop into the agricultural machine.

5. The method of claim 1, wherein the one or more machine parameters received by the controller includes a position of the opposing knives.

6. The method of claim 1, wherein the one or more machine parameters received by the controller includes a rotational speed of the chopper rotor.

7. The method of claim 1, wherein the one or more machine parameters received by the controller includes a position of the guide vanes.

8. The method of claim 1, wherein the one or more machine parameters received by the controller includes a position of the thresher basket.

9. The method of claim 1, wherein the one or more machine parameters received by the controller includes a rotational speed of the threshing rotor.

10. The method of claim 1, wherein the one or more measured performance parameters includes a force on the opposing knives.

11. The method of claim 1, wherein the one or more measured performance parameters includes or is indicative of a torque of the chopper rotor.

12. The method of claim 1, wherein the one or more measured performance parameters includes or is indicative of a torque of the threshing rotor.

13. The method of claim 1, wherein the one or more measured performance parameters includes a chop quality of the harvested crop.

14. The method of claim 1, wherein processing the harvested crop includes processing the harvested crop with both: the threshing rotor in cooperation with at least one of the thresher basket and the guide vanes, and the chopper rotor in cooperation with the opposing knives.

15. The method of claim 1, further comprising:

outputting, via a user interface operatively coupled to the controller, a categorical designation for the one or more crop conditions, wherein the categorical designation is associated with the one or more crop conditions being greater than, less than, or within a predetermined range for the one or more crop conditions.

16. A method of determining one or more crop conditions of harvested crop processed by an agricultural machine, the method comprising:

moving the agricultural machine through a worksite to harvest crop;

processing the harvested crop with at least one of: a threshing rotor in cooperation with at least one of a thresher basket and guide vanes, and a chopper rotor in cooperation with opposing knives;

measuring a first performance parameter selected from the group consisting of: torque of the threshing rotor or an indication thereof, torque of the chopper rotor or an indication thereof, and force on the opposing knives;

measuring a chop quality of the harvested crop;

determining, via a controller, one or more crop conditions based on the measured first performance parameter and the measured chop quality of the harvested crop, the one or more crop conditions including at least one of a moisture level of the harvested crop and a toughness level of the harvested crop;

identifying, via the controller, a relationship between the one or more measured performance parameters and the one or more machine parameters;

receiving a user input, in response to the identified relationship, initiating an adjustment of at least one parameter of the one or more machine parameters; and adjusting, via the controller and in response to the user input, the at least one parameter.

17. The method of claim 16, wherein measuring the chop quality of the harvested crop includes measuring the length of the harvested crop after the harvested crop is processed by the chopper rotor in cooperation with the opposing knives.

18. The method of claim 16, wherein determining, via the controller, one or more crop conditions includes:

determining, via the controller, a degree of processing associated with the harvested crop after the harvested crop is processed by the chopper rotor in cooperation with the opposing knives.

19. An agricultural machine for processing harvested crop comprising:

a cutting head configured to harvest crop;

at least one of a threshing assembly and a crop debris routing assembly, the threshing assembly including a threshing rotor configured to rotate to process the harvested crop in cooperation with at least one of a thresher basket and guide vanes, and the crop debris routing assembly including opposing knives and a chopper rotor configured to rotate relative to the opposing knives to process the harvested crop; and a controller configured to:

receive one or more machine parameters and one or more performance parameters and determine at least one of a moisture level of the harvested crop and a toughness level of the harvested crop based on the received one or more machine parameters and one or more performance parameters;

determine, for each of a plurality of times, a ratio of a performance parameter of the one or more performance parameters to a machine parameter of the one or more machine parameters; and generate, in response to a determination that an amount of change in the ratio over time exceeds a stored threshold amount of change, a signal to adjust the machine parameter, the adjustment based on an identified relationship between the performance parameter and the machine parameter;

wherein the one or more machine parameters include at least one of: a feed rate of harvested crop into the cutting head or an indication thereof, a rotational speed of the threshing rotor, a position of at least one of the thresher basket and the guide vanes relative to the threshing rotor, a rotational speed of the chopper rotor, and a position of the opposing knives relative to the chopper rotor; and wherein the one or more performance parameters include at least one of: torque of the threshing rotor or an indication thereof, torque of the chopper rotor or an indication thereof, force on the opposing knives, and chop quality of the harvested crop.

20. The agricultural machine of claim 19, further comprising:

at least one sensor positioned on the agricultural machine and configured to measure at least one of: torque of the threshing rotor or an indication thereof, torque of the chopper or an indication thereof, force on the opposing knives, and chop quality of the harvested crop.

* * * * *